(12) United States Patent
Van Beurden et al.

(10) Patent No.: US 12,036,818 B2
(45) Date of Patent: Jul. 16, 2024

(54) AERODYNAMIC WHEEL

(71) Applicant: 2592497 ONTARIO INC., Toronto (CA)

(72) Inventors: Nicole Van Beurden, Toronto (CA); Philip White, Toronto (CA)

(73) Assignee: 2592497 ONTARIO INC., Toronto (CA)

( * ) Notice: Subject to any disclaimer, the term of this patent is extended or adjusted under 35 U.S.C. 154(b) by 237 days.

(21) Appl. No.: 17/202,495

(22) Filed: Mar. 16, 2021

(65) Prior Publication Data
US 2021/0283946 A1    Sep. 16, 2021

Related U.S. Application Data

(60) Provisional application No. 62/989,943, filed on Mar. 16, 2020.

(51) Int. Cl.
*B60B 7/00* (2006.01)
*B60B 21/06* (2006.01)

(52) U.S. Cl.
CPC .......... *B60B 7/0006* (2013.01); *B60B 21/062* (2013.01); *B60Y 2200/13* (2013.01)

(58) Field of Classification Search
CPC .......... B60B 7/0006; B60B 7/02; B60B 7/06; B60B 21/062; B60B 2900/1216; B60Y 2200/13
See application file for complete search history.

(56) References Cited

U.S. PATENT DOCUMENTS

| | | | | |
|---|---|---|---|---|
| 1,167,124 A | * | 1/1916 | Sloper | B60B 7/0006 |
| | | | | 301/37.104 |
| 4,660,893 A | * | 4/1987 | Huntzinger | B60B 7/0006 |
| | | | | 301/37.42 |
| 4,712,838 A | | 12/1987 | Berg et al. | |
| 4,978,174 A | | 12/1990 | Nosler | |

(Continued)

FOREIGN PATENT DOCUMENTS

| | | | | |
|---|---|---|---|---|
| DE | 4231539 A1 | | 6/1993 | |
| EP | 0014990 A1 | * | 9/1980 | B60B 7/0006 |

OTHER PUBLICATIONS

European Search Report dated Jul. 7, 2021, for Europe Patent Application No. 21162876.3.

*Primary Examiner* — S. Joseph Morano
*Assistant Examiner* — Emily G. Castonguay

(57) ABSTRACT

Described herein are aerodynamic wheels. According to some embodiments there is provided a wheel for a vehicle comprising: a rim; an inner hub; an attachment assembly configured to couple rim to inner hub; a first air engaging flexible and aerodynamic surface overlaying the attachment assembly configured to couple rim to inner hub and operatively connected to the inner hub and the rim, forming a first axial surface of the wheel; and a second air engaging flexible and aerodynamic surface overlaying the attachment assembly configured to couple rim to inner hub and operatively connected to the inner hub and the rim, forming a second axial surface of the wheel, which is axially opposed to the said first surface of the wheel; wherein said first air engaging flexible and aerodynamic surface and second air engaging flexible and aerodynamic surface are adaptable to external forces and change shape, when subject to such external forces.

19 Claims, 13 Drawing Sheets

(56) References Cited

U.S. PATENT DOCUMENTS

| | | | |
|---|---|---|---|
| 5,131,727 A * | 7/1992 | Johnson | B60B 7/02 |
| | | | 301/37.43 |
| 5,603,553 A | 2/1997 | Klieber et al. | |
| 7,114,785 B2 | 10/2006 | Ording et al. | |
| 8,708,424 B2 | 4/2014 | Mercat et al. | |
| 8,888,195 B1 | 11/2014 | Hed et al. | |
| 2013/0342003 A1 * | 12/2013 | Meggiolan | B60B 1/042 |
| | | | 301/58 |
| 2018/0333983 A1 * | 11/2018 | Edin | B60B 3/14 |

* cited by examiner

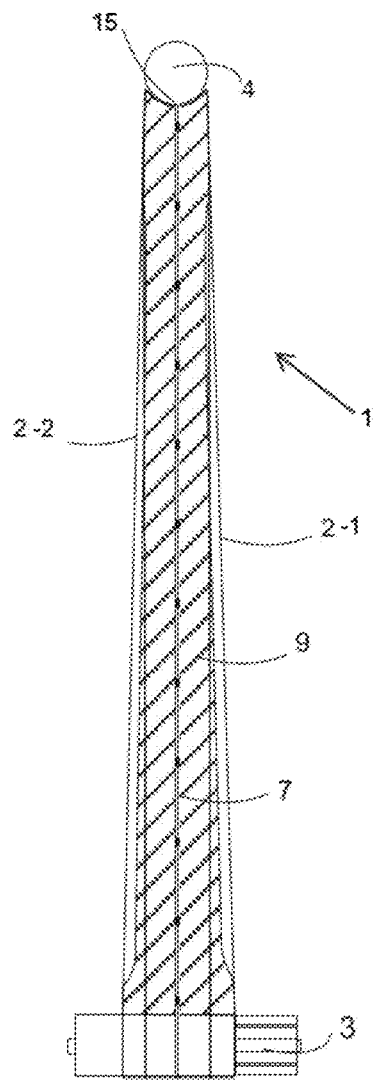

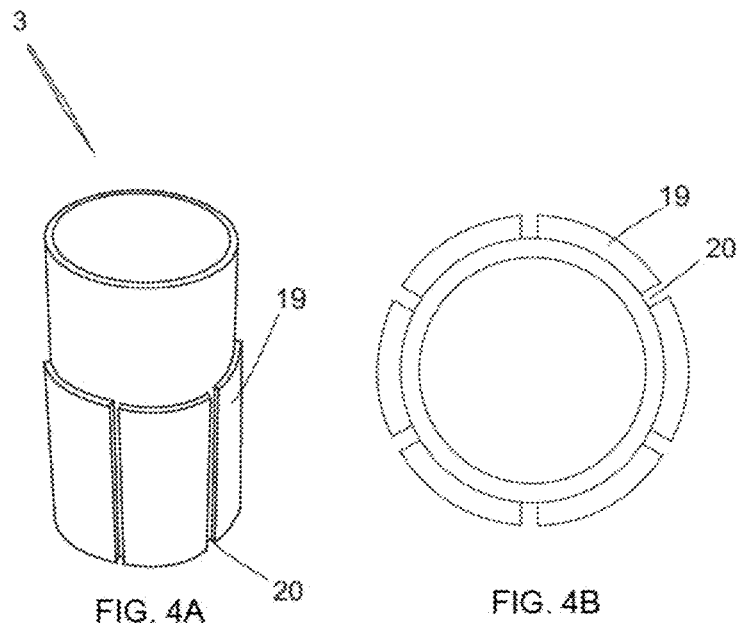
FIG. 4A  FIG. 4B
FIG. 5
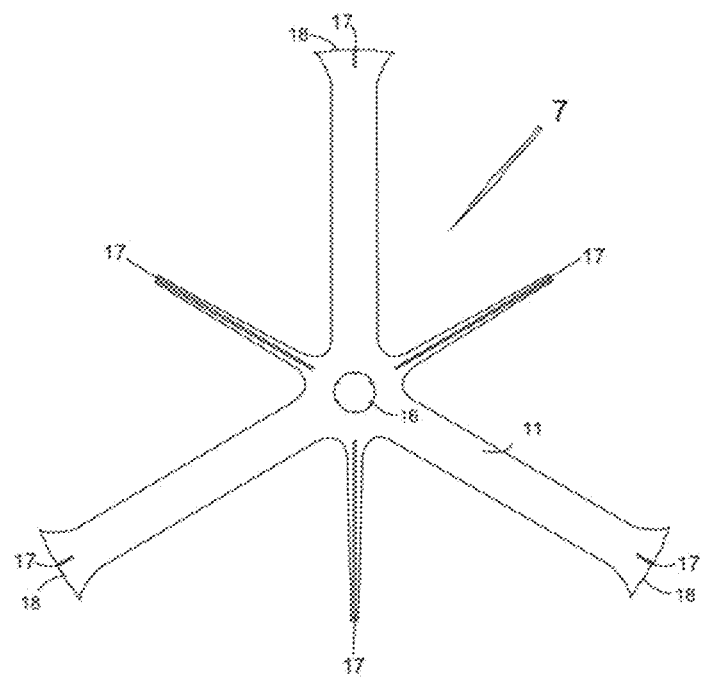

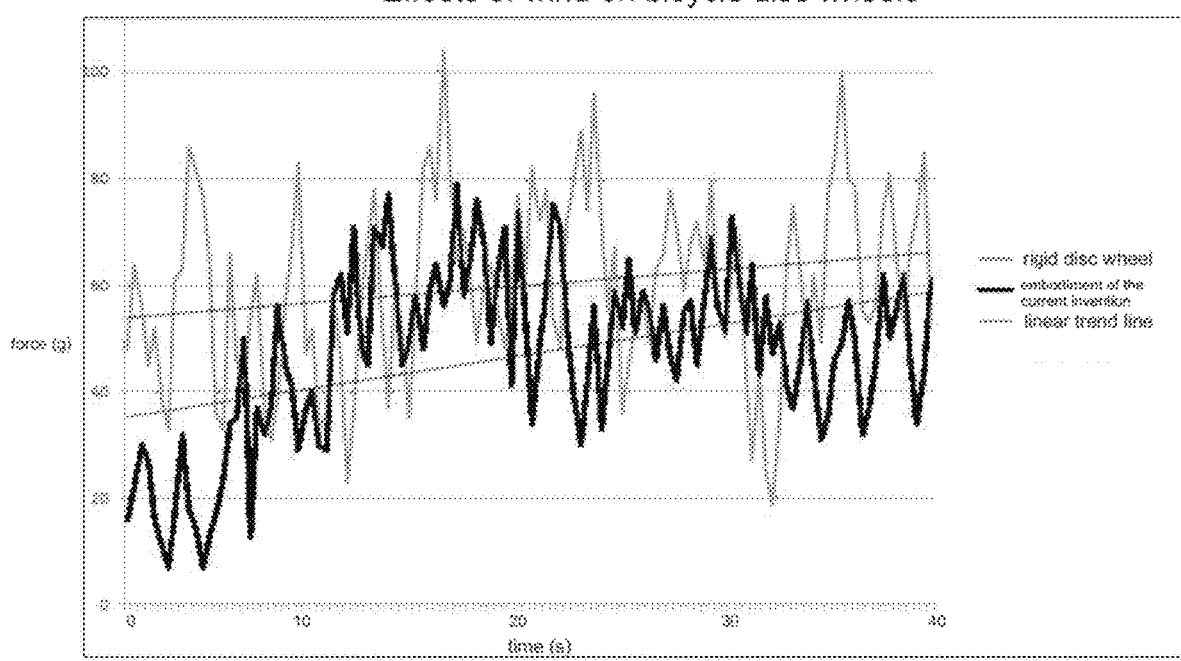

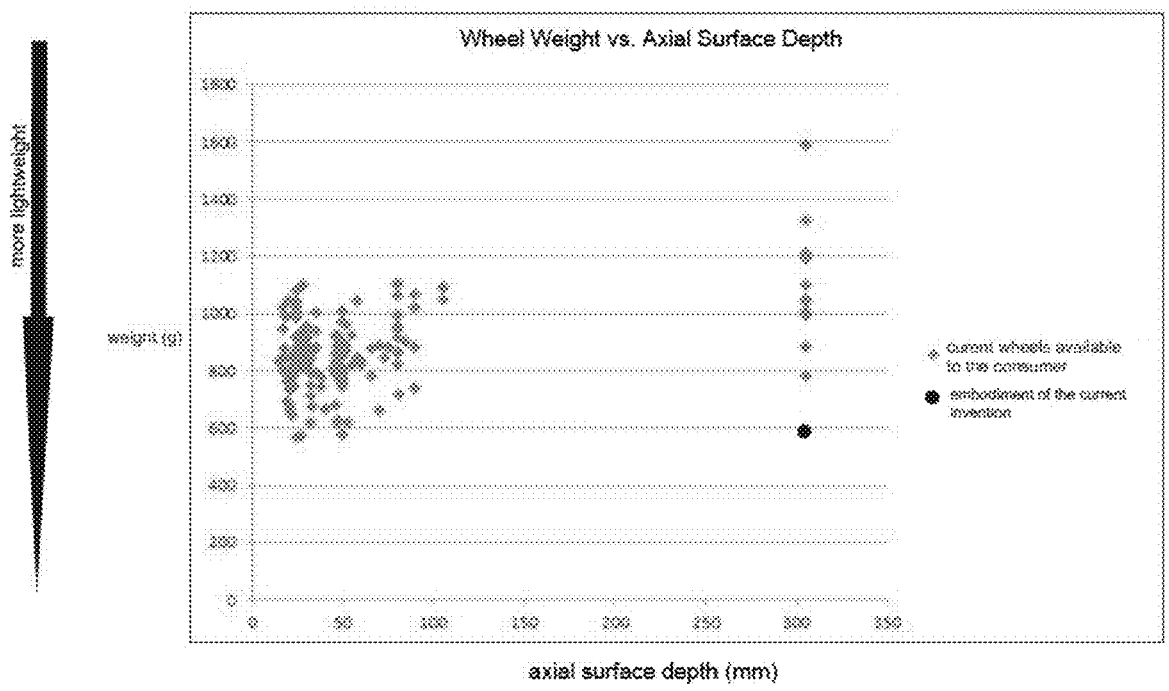

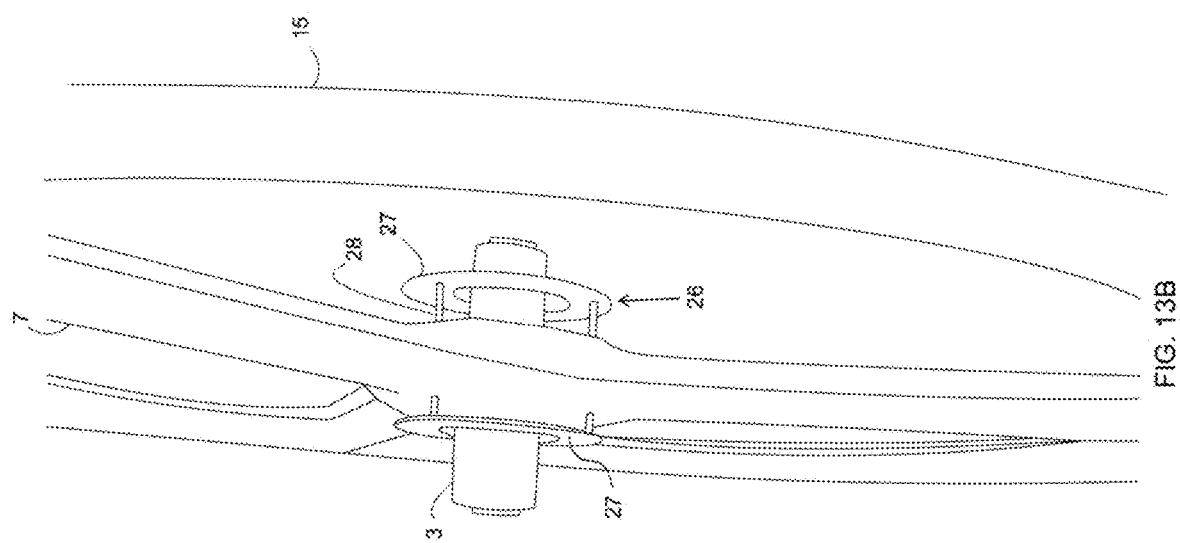
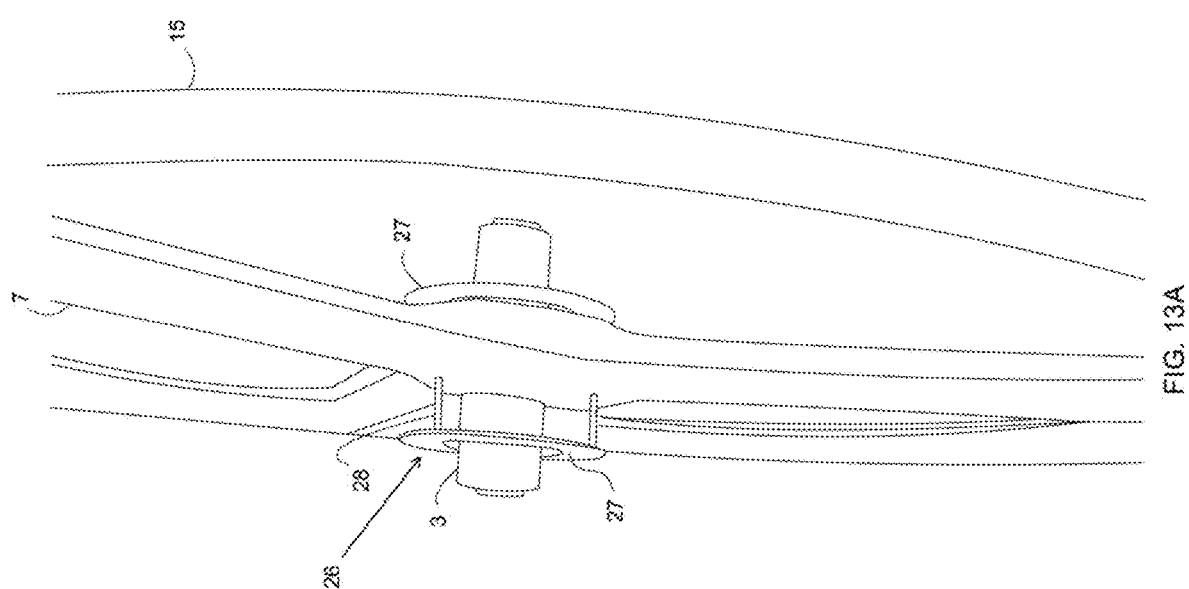

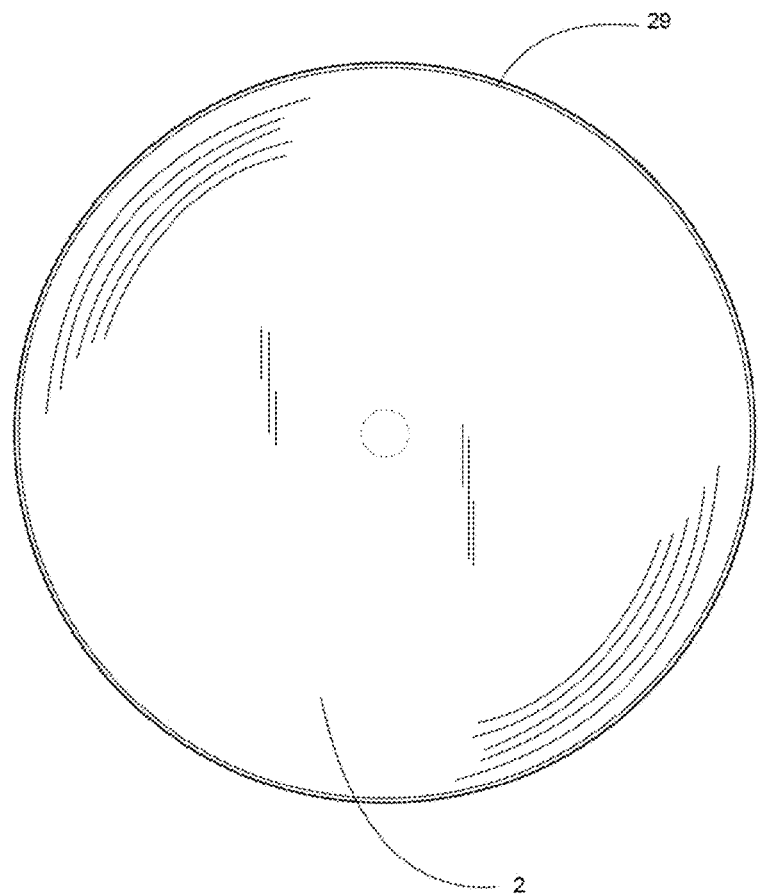
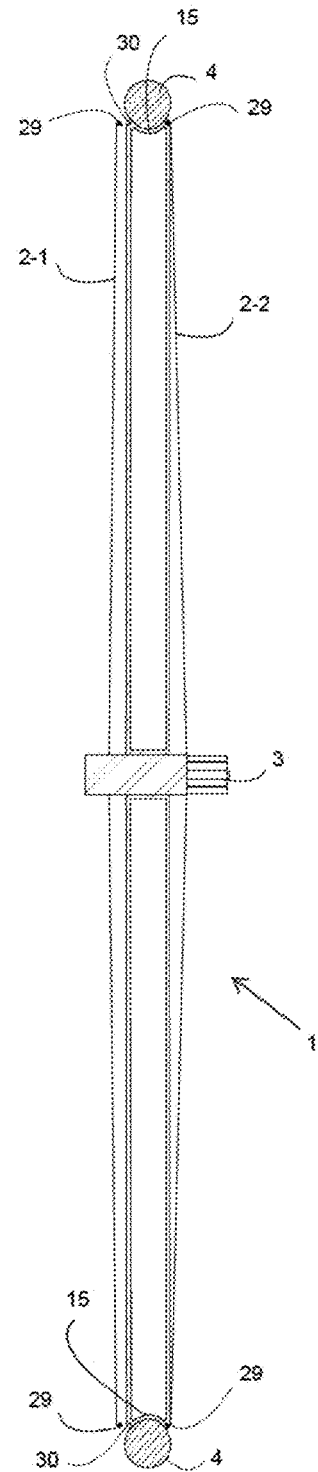
FIG. 15A
FIG. 15B

AERODYNAMIC WHEEL

CROSS REFERENCE TO PRIOR APPLICATIONS

This application claims priority to U.S. provisional patent application 62/989,943 filed Mar. 16, 2020, the content of which is incorporated herein by reference in its entirety.

FIELD

The present disclosure relates generally to a wheel for a vehicle, and specifically to a wheel with increased stall angles and decreased drag, such that the wheel is aerodynamic.

BACKGROUND

Several different forces oppose the movement of a wheel for a vehicle (such as a bicycle, handcycle, recumbent bicycle, wheelchair) when in use.

Using a bicycle as an example of a vehicle, a significant force acting against the movement of the bicycle is the drag induced by the bicycle's movement through the air. These drag forces are particularly problematic for athletic and professional cyclists. The power required to overcome this drag force is proportional to the speed of the vehicle raised to the third power. Greater speed results in greater drag which in turn requires the cyclist to expend greater energy to overcome the drag and this detrimentally affects a cyclist's performance. Accordingly, reducing the drag forces is an important consideration for racing cyclists and for other serious cyclists.

A major source of drag on a bicycle results from the flow of air over and around the bicycle wheels. It is known that conventional wheels for bicycles typically comprise a rim carrying a tire which rolls on the ground, a hub rotatable on a pin fixed to the bicycle frame, and a plurality of spokes connecting the rim to the hub. Traditional spoked wheels are generally stable in crosswinds and, depending on the materials used in their manufacture, can be lightweight and stiff. However, traditional spoked wheels create a significant drag force.

SUMMARY OF THE INVENTION

According to some embodiments, the present disclosure describes a wheel for a vehicle comprising: a rim; an inner hub located radially inward from the rim; an attachment assembly configured to couple the rim to the inner hub; a first air engaging flexible and aerodynamic surface overlaying the attachment assembly configured to couple the rim to the inner hub, where the radially medial edge of the first air engaging flexible and aerodynamic surface is operatively connected proximate to the inner hub, and the radially distal perimeter edge of the first air engaging flexible and aerodynamic surface is operatively connected proximate to the rim, forming a first axial surface of the wheel; and a second air engaging flexible and aerodynamic surface overlaying the attachment assembly configured to couple the rim to the inner hub, where the radially medial edge of the second air engaging flexible and aerodynamic surface is operatively connected proximate to the inner hub, and the radially distal perimeter edge of the second air engaging flexible and aerodynamic surface is operatively connected proximate to the rim, forming a second axial surface of the wheel, which is axially opposed to the said first surface of the wheel; where said first air engaging flexible and aerodynamic surface and said second air engaging flexible and aerodynamic surface are adaptable to external forces and change shape, when subject to the external forces.

According to some embodiments, the external forces comprise wind.

According to some embodiments, the attachment assembly configured to couple the rim to the inner hub comprises: a plurality of spokes extending radially from the inner hub to the rim; a multi-arm central drive plate and laterally oriented, interlocking cross ribs; or between two and eight arms.

According to some embodiments, the rim is configured to operatively engage a tubular tire, a tubeless tire or a clincher tire.

According to some embodiments, the rim further comprises a brake track.

According to some embodiments, the inner hub comprises a rear-wheel disc brake hub, a front-wheel disc brake hub, a rear-wheel non-disc brake hub, a front-wheel non-disc brake hub, a free-wheel hub or a combination thereof.

According to some embodiments, the first air engaging flexible and aerodynamic surface and the second air engaging flexible and aerodynamic surface are comprised of rubber, silicone, latex, shrink wrap film, stretch film, or a combination thereof.

According to some embodiments, the first air engaging flexible and aerodynamic surface and the second air engaging flexible and aerodynamic surface are of variable thickness.

According to some embodiments, the tension of the first air engaging flexible and acrodynamic surface is different from the tension of the second air engaging flexible and acrodynamic surface.

According to some embodiments, the first air engaging flexible and aerodynamic surface and the second air engaging flexible and aerodynamic surface are mechanically coupled to the attachment assembly configured to couple the rim to the inner hub.

According to some embodiments, the radially distal perimeter edges of each of the first air engaging flexible and aerodynamic surface and the second air engaging flexible and aerodynamic surface are operatively connected proximate to the rim by: an elastic embedded in the radially distal perimeter edges of each of the first air engaging flexible and aerodynamic surface and the second air engaging flexible and acrodynamic surface, where the elastic couples with ridges on each axial side of the rim; or a chemical adhesive.

According to some embodiments, the radially distal perimeter edges of each of the first air engaging flexible and aerodynamic surface and the second air engaging flexible and aerodynamic surface are operatively connected proximate to the rim by splines operatively coupled to the radially distal perimeter edges of the first air engaging flexible and aerodynamic surface and the second air engaging flexible and aerodynamic surface, where the splines couple with grooves in each axial side of the rim.

According to some embodiments, the vehicle is a bicycle.

According to some embodiments, the present disclosure describes a wheel for a vehicle comprising: a rim; an inner hub located radially inward from the rim; an attachment assembly configured to couple the rim to the inner hub; a first air engaging flexible and aerodynamic surface overlaying the attachment assembly configured to couple the rim to the inner hub, where the radially medial edge of the first air engaging flexible and aerodynamic surface is operatively connected proximate to the inner hub, and the radially distal perimeter edge of the first air engaging flexible and aerodynamic surface is operatively connected proximate to the rim, forming a first axial surface of the wheel; a second air engaging flexible and aerodynamic surface overlaying the attachment assembly configured to couple the rim to the inner hub, where the radially medial edge of the second air engaging flexible and aerodynamic surface is operatively connected proximate to the inner hub, and the radially distal perimeter edge of the second air engaging flexible and aerodynamic surface is operatively connected proximate to the rim, forming a second axial surface of the wheel, which is axially opposed to the said first surface of the wheel; and an internal sliding mechanism located more proximate to the inner hub than the rim, and operatively connected to the first air engaging flexible and aerodynamic surface and the second air engaging flexible and aerodynamic surface; where said first air engaging flexible and aerodynamic surface and said second air engaging flexible and aerodynamic surface are adaptable to external forces and change shape, when subject to such external forces; where the internal sliding mechanism is configured to enable the first air engaging flexible and aerodynamic surface and the second air engaging flexible and aerodynamic surface to move concurrently and laterally in a leeward direction; and where the internal sliding mechanism is configured to move independently from the inner hub, the rim and the attachment assembly configured to couple the rim to the inner hub.

According to some embodiments, the external forces comprise wind.

According to some embodiments, the internal sliding mechanism is comprised of: two axially opposed circular face plates; and a plurality of linear bearings arranged in a parallel configuration; where the circular face plates are coupled to each axial end of the linear bearings, where the linear bearings are slidably engaged with the attachment assembly configured to couple the rim to the inner hub, more proximate to the inner hub than the rim; where the circular face plates are operatively connected to the first air engaging flexible and aerodynamic surface and the second air engaging flexible and aerodynamic surface; and where the linear bearings permit the first air engaging flexible and aerodynamic surface and the second air engaging flexible and aerodynamic surface to move in a concurrent lateral and leeward direction, independent from the inner hub, rim and the attachment assembly configured to couple the rim to the inner hub.

According to some embodiments, the internal sliding mechanism comprises a free-floating cylinder that encircles the inner hub; where the first air engaging flexible and aerodynamic surface and the second air engaging flexible and aerodynamic surface are each coupled to the axially opposed circular faces of said free-floating cylinder; and where the free-floating cylinder permits the first air engaging flexible and aerodynamic surface and the second air engaging flexible and aerodynamic surface to move in a concurrent lateral and leeward direction, independent from the inner hub, rim and the attachment assembly configured to couple the rim to the inner hub.

BRIEF DESCRIPTIONS OF THE DRAWINGS

For a better understanding of the various implementations described herein and to show more clearly how they may be carried into effect, reference will now be made, by way of example only, to the accompanying drawings in which:

FIG. 2 depicts a diagrammatic representation of a cross-sectional front view of the internal structure of a wheel, according to non-limiting embodiments;

FIG. 4A depicts a perspective view of splined inner hub components of a wheel, according to non-limiting embodiments;

FIG. 4B depicts a top plan view of a splined inner hub components of a wheel, according to non-limiting embodiments;

FIG. 5 depicts a side elevation view of a multi-arm central drive plate component of a wheel, according to non-limiting embodiments;

FIG. 8A depicts a front elevation view of a wheel, according to non-limiting embodiments;

FIG. 8B depicts a front elevation view of a wheel, with a wind force, showing the airfoil shape formed when transformed by wind, according to non-limiting embodiments;

FIG. 9 depicts a chart illustrating test data (time (s) on the x axis, wind force (g) on the y axis) for reactivity of a rigid disc wheel versus an embodiment of the current invention, in cross winds, according to non-limiting embodiments;

FIG. 10 depicts a chart illustrating egg drop test results to demonstrate shock absorbing ability of an embodiment of the current invention compared to a traditional rigid disc wheel, according to non-limiting embodiments;

FIG. 11 depicts a chart illustrating data (axial surface depth (mm) on the x axis and weight (g) on the y axis) of weight and aerodynamic profile of wheels currently on the market available to consumers, compared to the weight and aerodynamic profile of an embodiment of the current invention, according to non-limiting embodiments;

FIGS. 13A and 13B depict a perspective and partial view of a partially assembled wheel further comprising an internal sliding mechanism, according to non-limiting embodiments;

FIG. 15A depicts a top plan view of an air engaging flexible and aerodynamic surface, prior to assembly, according to non-limiting embodiments;

FIG. 15B depicts a diagrammatic representation of a cross-sectional front view of the internal structure of a wheel, during assembly, according to non-limiting embodiments;

DETAILED DESCRIPTION

Figure 1A:
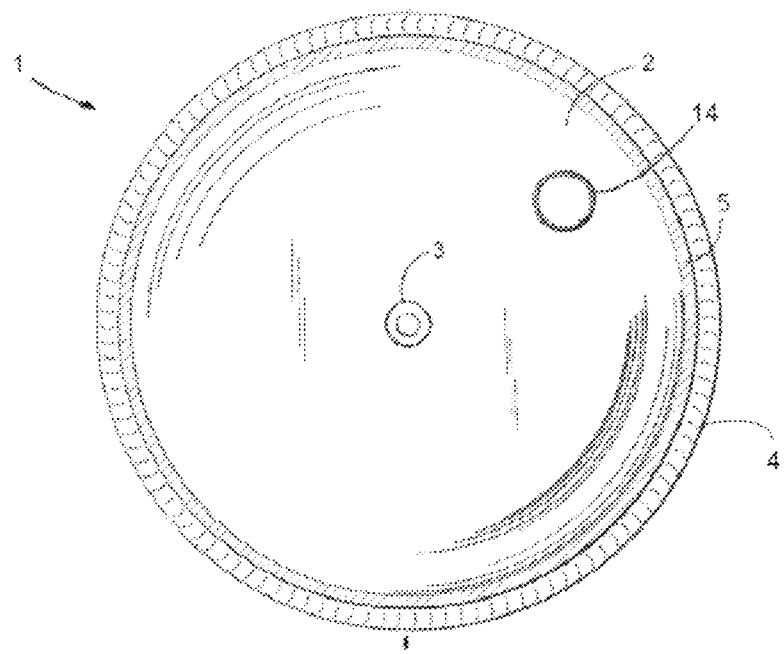
FIG. 1A depicts a diagrammatic representation of a side elevation view of a wheel, according to non-limiting embodiments.

Innovation in cycling has always followed dogmatic thinking that the goal of a cyclist and of a manufacturer of bicycles and wheels is for the wheels, bicycle and cyclist to become as invisible to the wind as possible, particularly to reduce drag.

Various manufacturers have attempted to reduce drag, as exemplified in the description of the following U.S. Patents.

The aerodynamic bicycle rim disclosed in U.S. Pat. No. 8,888,195 describes a deep rim wheel that is wider than the tire—the rim is widest at a point radially outward towards the edge of the rim and tire, and then gets narrower radially closer to the center axle. Deep rim wheels, such as the rim disclosed in U.S. Pat. No. 8,888,195, offer some aerodynamic benefits along with perceived and actual stability of the wheel under certain wind forces, such as apparent crosswinds. However, such rim wheels compromise aerodynamic benefits due to greater drag forces, as compared to a full disc wheel.

U.S. Pat. No. 7,114,785 discloses a solid disc wheel with rigid load-bearing skins that are textured to create a turbulent aerodynamic boundary layer and reduce aerodynamic drag. U.S. Pat. No. 7,114,785 describes a wheel which would be considered a traditional disc-wheel. However, the wheel disclosed in U.S. Pat. No. 7,114,785 has the drawbacks of being heavy relative to traditional spoked wheels and unstable under certain wind forces.

The disc wheel disclosed in U.S. Pat. No. 4,978,174 describes a traditional spoked wheel with a smooth surface, smoothly stretched film disc skin bonded to a rim and hub. This disc cover is smoothly stretched meaning that the wheel is not capable of adapting to the wind. As a result, this disc wheel has the drawback of being unstable in certain wind conditions, such as apparent crosswinds.

As is evident from the summary of the U.S. Patents described above, prior art bicycle wheels have attempted to reduce drag through the use of a deep-dish rim, a solid faced, disc wheel or rigid wheels covers.

To decrease the drag associated with traditional spoked wheels, wheels with rims of significant depth and disc wheels have been developed, with solid disc wheels offering aerodynamic advantages over deep-dish rim wheels. Deep-dish wheels are generally lighter and more stable in crosswinds, but do not provide the same aerodynamic advantages and reduced drag that a solid, disc wheel provides. In disc wheels, the wheel hub and the rim are no longer connected through spokes, but through a disc or through a pair of flat or curved walls (lenticular wheels). In wheels of this type, the materials and structure used to achieve the associated aerodynamic benefits lead to a substantially heavier wheel. There has typically been a trade-off between aerodynamics and weight—wheels generally become heavier as their aerodynamics improve.

Although existing disc wheels substantially reduce or eliminate drag caused by the movement of air over and around the spokes as well as over and around the rim of the wheel, they are far heavier, and much more unstable in crosswinds as compared to spoked wheels. The increased weight of the traditional disc wheels, as compared to ordinary spoked wheels, makes traditional disc wheels totally inadequate for normal or daily use, or even for use by the general population of race competitors, let alone for the general population of athletic cyclists.

A cyclist who chooses the aerodynamic advantages of a disc wheel would have to also accept and overcome this additional weight and instability in crosswinds. While it is challenging to measure instability in crosswinds, anecdotally cyclists frequently report perceived instability when riding traditional disc wheels in an apparent cross wind.

It can therefore be said that there are multiple problems currently sought to be solved in the research and development of wheels for vehicles, such as bicycles, by manufacturers and designers conducting research and development on wheels for such vehicles. These problems are also sought to be solved for other vehicles, such as handcycles, recumbent bicycles, and wheelchairs.

The first problem sought to be solved is manufacturing a stiff and light wheel. The second problem sought to be solved is manufacturing a wheel with low drag, which is also stable in cross winds.

To date, these problems have been addressed separately and with conventional means. The first problem has been addressed by using a typical spoked wheel structure and by simply manufacturing such wheels leveraging the properties of improved materials available and more advanced techniques in their production. The second problem has been addressed by finding a compromise between low drag and stability—wheels with lower drag are consistently less stable in cross winds, while wheels that achieve greater stability in cross winds have higher drag. In addressing this second problem, the requirements of strength and weight of the wheels are also frequently compromised to achieve lower drag.

A further problem faced by both manufacturers and consumers alike is that because of the many drawbacks of a traditional disc wheel (increased weight, instability in crosswinds, slower acceleration, only suited to certain race course profiles, only suited to athletes of a particular strength and weight), the market is very small. The cyclist using such a wheel must be sufficiently strong and heavy to overcome the weight and instability drawbacks of a traditional disc wheel. This will often eliminate a good percentage of the consumer population, as cyclists who are light are often unwilling to ride traditional disc wheels. Furthermore, even though it is far more aerodynamic, a traditional disc wheel will not always be faster, depending on a course profile and wind conditions. There is a constant tradeoff for a cyclist between the advantages and the disadvantages of a traditional disc wheel.

Accordingly, there is a need for a wheel for a vehicle, such as a bicycle, that offers all of the aerodynamic advantages of a traditional disc wheel, without any of its disadvantages, such as increased weight and instability in crosswinds. The vehicle may have multiple such wheels. In one embodiment, the wheel is a wheel for a bicycle. If such a wheel were to be available, this wheel would be usable more universally by cyclists at all levels of the sport, on various courses and in various levels of riding conditions.

Prior to this invention, conventional thinking would have led skilled persons away from the wheel described herein, for at least the following reasons. According to conventional thinking:

1. it would be impossible for a wheel to absorb and dissipate crosswind forces. The conventional reasoning was that the wind force was the same as the surface area of the disc wheel, therefore the cyclist would experience the same impact of the wind forces. However, such an analysis fails to consider the shape and material properties of the wheel itself.
2. the flexibility of the axial surfaces of a wheel would have no impact on its ability to be stable in cross winds.
3. an aerodynamic disc wheel could not be manufactured to be significantly lighter than a spoked wheel.
4. disc wheels are generally understood to be, and are accepted as being, ill-suited for use on hilly or mountainous terrain, ill-suited for use in extreme wind conditions and ill-suited for use by lighter or less powerful riders.
5. there will always be a tradeoff between aerodynamics and weight. An aerodynamic gain will always come at a cost of increased rotational weight. Dogmatic thinking in the industry is that this trade off could not be avoided.

According to at least some embodiments, the wheels described herein harness and leverage external forces, like the wind.

It will be appreciated that for simplicity and clarity of illustration, where considered appropriate, reference numerals may be repeated among the figures to indicate corresponding or analogous elements. In addition, numerous specific details are set forth in order to provide a thorough understanding of the exemplary aspects of the present application described herein. However, it will be understood by those of ordinary skill in the art that the exemplary aspects described herein may be practiced without these specific details. In other instances, well-known methods, procedures and components have not been described in detail so as not to obscure the exemplary aspects described herein. Also, the description is not to be considered as limiting the scope of the exemplary aspects described herein. Any systems, methods, components, parts of components, and the like described herein in the singular are to be interpreted as also including a description of such systems, methods, components, parts of components, and the like in the plural, and vice versa.

Figure 1B:
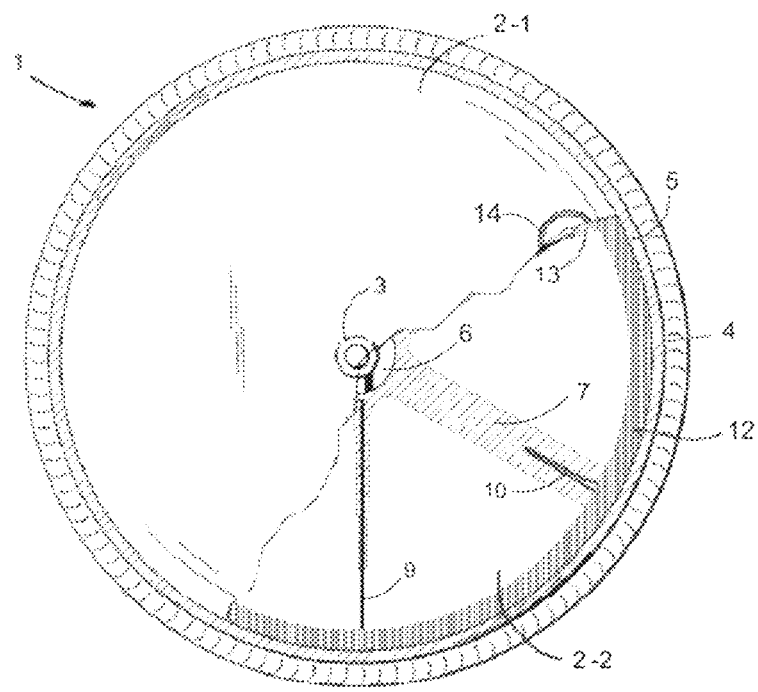
FIG. 1B depicts a diagrammatic representation of a side elevation view, partially sectioned, of a wheel, as shown in FIG. 1A, according to non-limiting embodiments.

Turning to FIGS. 1A and 1B, an example embodiment of this invention is a wheel 1 for vehicles, such as bicycles, which, at least according to certain embodiments, is light, aerodynamic and stable in external forces like crosswinds. According to certain embodiments, the attachment assembly configured to couple rim 15 to inner hub 3 may be optimized to create a stiff internal structure for wheel 1. According to certain embodiments, wheel 1 is aerodynamic and stable in external forces like crosswinds due to the flexible and adaptive nature of the first air engaging flexible and aerodynamic surface 2-1 and second air engaging flexible and aerodynamic surface 2-2. According to at least certain embodiments, the use of the described wheels 1 (during races in particular) will benefit a cyclist, by reducing the cyclist's fatigue and ensuring the cyclist's safety. According to at least certain embodiments, the described wheels 1 provide an overall solution to the problems previously identified in the industry, by meeting the need for an aerodynamic and lightweight wheel for vehicles, such as bicycles designed for sports use and especially in competition. According to certain embodiments, the wheel 1 weighs less than 800 grams. According to certain embodiments, the wheel 1 may be used as the front or rear wheel 1 of a bicycle.

Before proceeding, several concepts used in the relevant field when discussing the aerodynamics of wheels and wind forces (which comprise external forces which bicycles and cyclists frequently encounter), will be described. Attention is drawn to FIG. 12 which illustrates certain of the below-mentioned concepts. "Leeward" is the direction downwind from a point of reference. A moving object 25, such as a cyclist, the cyclist's bicycle and bicycle wheels, may be subject to a different wind angle than a stationary object. For clarity, wind angles may be determined with reference to the direction of travel 23 (as a possible 0° reference point). Stationary objects are subject to an atmospheric wind 21 angle which is the direction from which the wind is naturally blowing. A moving object 25 is subject to an apparent wind 22 angle, which is determined by the atmospheric wind 21 angle and the direction of travel 23 of the moving object 25. The apparent wind 22 angle is the angle of the wind relative to the moving object 25. The direction of thrust 24 experienced by the moving object 25 occurs at a 90° angle to the apparent wind 22 angle.

Figure 12:
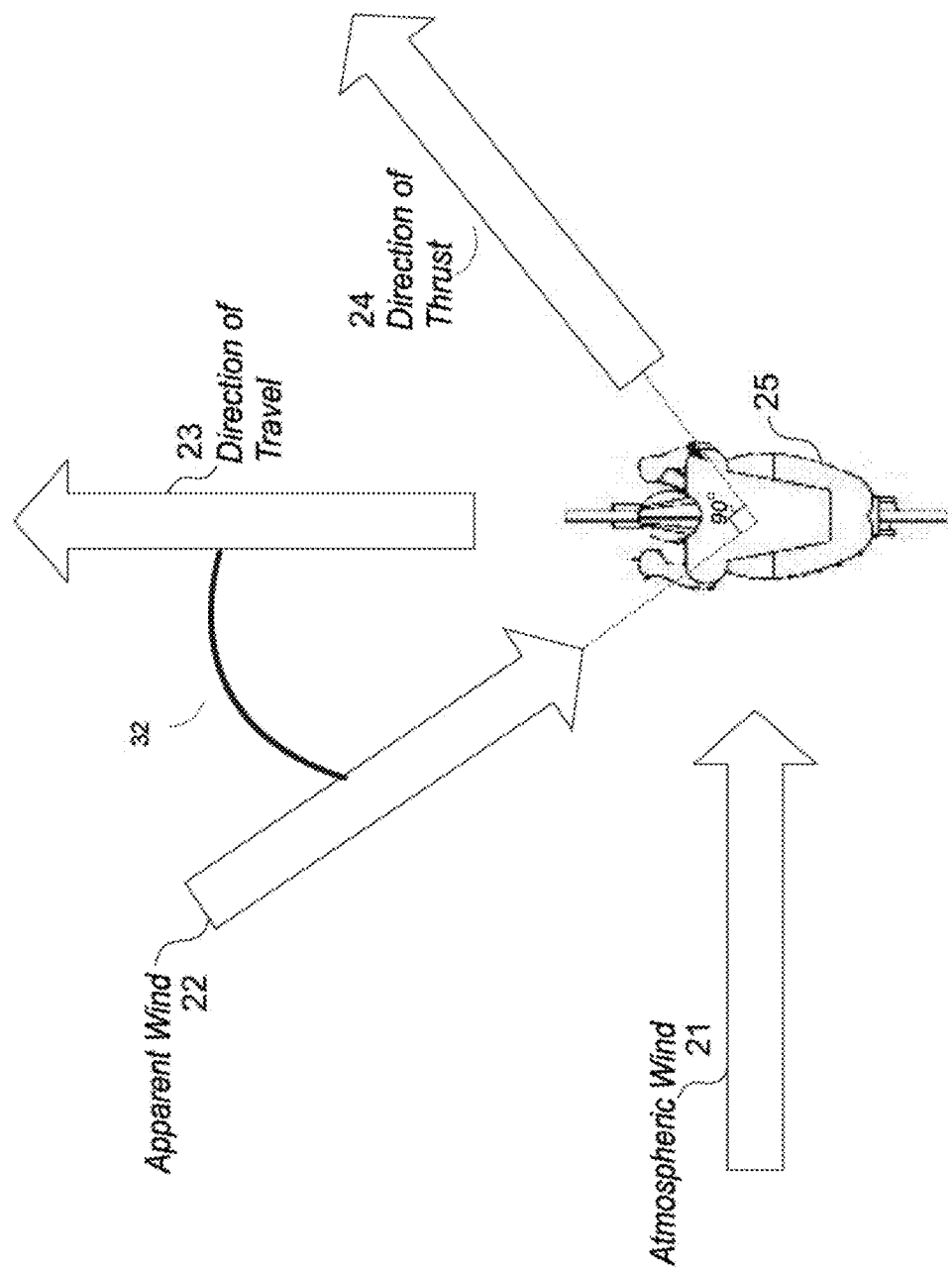
FIG. 12 depicts an illustration of certain wind force concepts.

With continued reference to FIG. 12, for a moving object 25, the apparent wind 22 angle will be equal to the yaw angle 32 as directly measured in a wind tunnel. Yaw angle 32 is the angle between direction of travel 23 and apparent wind 22 angle. Airflow over a moving object 25, where the air is moving at the same speed and in the same direction as the moving object 25 is referred to as laminar airflow. As the yaw angle 32 becomes greater, at a certain yaw angle 32 the airflow over an object ceases to be laminar. At a certain yaw angle 32, the airflow becomes non-laminar and turbulent, which increases the drag forces on the moving object 25 as compared to the drag forces on the moving object 25 during laminar airflow. The yaw angle 32 at which the airflow changes from laminar to non-laminar is referred to as the "stall angle." By increasing the stall angle of a moving object 25, a moving object 25 can be subject to greater yaw angles 32 while maintaining positive aerodynamics and lower drag forces, which may be indicated by a larger negative value.

Attention is now directed to FIGS. 8A and 8B, 9, 10, 11 and 14 where the aerodynamic benefits of embodiments of wheel 1 are described.

FIGS. 8A and 8B depict how, according to certain embodiments, first air engaging flexible and aerodynamic surface 2-1 and second air engaging flexible and aerodynamic surface 2-2 are adaptable to external forces and change shape, when subject to the external forces. FIG. 8A depicts a wheel 1, according to an embodiment of the current invention, without an external force. FIG. 8B depicts a wheel 1, according to an embodiment of the current invention, when wheel 1 is subject to an external force (an apparent wind 22 force). The change in shape of the first air engaging flexible and aerodynamic surface 2-1 and second air engaging flexible and aerodynamic surfaces 2-2 between FIG. 8A and FIG. 8B demonstrate the adaptation of first air engaging flexible and aerodynamic surface 2-1 and second air engaging flexible and aerodynamic surfaces 2-2 to external forces like the wind. Through this adaptation first air engaging flexible and aerodynamic surface 2-1 and said second air engaging flexible and aerodynamic surface 2-2 create a resulting high side of the airfoil, which generates lift and resulting thrust.

FIG. 9 graphically shows the behavior of various wheels in cross winds. Tests conducted demonstrated that first air engaging flexible and aerodynamic surface 2-1 and second air engaging flexible and aerodynamic surface 2-2 according to an embodiment of the current invention absorb and dampen the wind. A strain gauge, with a digital readout, was fused onto an axle, then a hard-sided disc wheel and an embodiment of the wheel 1 of the current invention were alternately placed on the axle, and wind was blown from a high output industrial fan onto the wheels from controlled angles, generating data points. Similar tests with a lower strength multi-speed fan demonstrated that embodiments of the current invention dampen wind effects. A BENETECH® GM8908 anemometer provided the exact speed of the wind that was being felt by the various wheels on each of the tests. The data points of the tests were plotted, and trend lines were overlaid for each (traditional hard sided disc and an embodiment of the current invention). The upper trend line (with a consistently higher force value compared to the lower trend line) is the trend line for a traditional hard sided disc wheel. The lower trend line (with a consistently lower force value compared to the higher trend line) is the trend line for an embodiment of the current invention.

Due to the flexible nature of first air engaging flexible and acrodynamic surface 2-1 and second air engaging flexible and aerodynamic surface 2-2 of embodiments of the current invention, the impact that crosswinds have on the increased surface area of a disc wheel (versus an open spoked wheel) is blunted, and thus cyclist stability is increased. Because first air engaging flexible and aerodynamic surface 2-1 and second air engaging flexible and acrodynamic surface 2-2 are flexible, they acted as a shock absorber to the wind, reducing the impact felt by the cyclist. As a result, low speed cross winds were not noticed, and higher speed cross winds were greatly absorbed by the adaptation of first air engaging flexible and aerodynamic surface 2-1 and second air engaging flexible and aerodynamic surface 2-2 to external forces like the wind.

Attention is directed to FIG. 10 which displays the results from a shock absorbing test of a traditional (hard sided) disc wheel, and a wheel 1 according to an embodiment of the current invention. Dozens of eggs were purchased (same batch number, same package date, same size), and starting with the hard-sided, traditional disc wheel, eggs were dropped from every 1" increment, starting at 12" and descending by 1" each time until the egg did not crack when hitting the surface of the disc wheel. Next, eggs were dropped from increasing distances, increasing in 1" increments onto a wheel 1 according to an embodiment of the current invention. The test ended at 30" (a 20-fold result over the traditional hard-sided disc), not because the egg cracked, but because it became too difficult to accurately drop the egg straight and to control how far off the upward facing air engaging flexible and aerodynamic surface 2 the eggs were bouncing. The results of this test illustrated the flexible and shock-absorbing nature of the air engaging flexible and aerodynamic surfaces 2.

Attention is now directed to FIG. 11 which graphically demonstrates a comparison between weight (in grams) and the aerodynamic profile (mm of axial surface depth), according to non-limiting embodiments. FIG. 11 illustrates that a wheel 1 according to an embodiment of the current invention was not only as light as the lightest wheels commercially available, but it was also as aerodynamic as the traditional disc wheels commercially available. As illustrated in FIG. 11 commercially available "light" wheels, with a low axial surface depth (less acrodynamic) range from slightly under 600 grams to slightly over 1000 grams. In comparison, commercially available "aerodynamic" wheels (being those with a greater axial surface depth) are generally heavier than the wheels with a low axial surface depth (less acrodynamic). A wheel 1 according to an embodiment of the current invention is however the only wheel with an axial surface depth of ~300 mm that has the unique ability to transform into an airfoil shape in the presence of cross winds, and the only wheel that has the ability to absorb and dissipate the effects of strong gusts and cross winds. These two benefits are due to the flexible nature of the first air engaging flexible and aerodynamic surface 2-1 and second air engaging flexible and acrodynamic surface 2-2 of the wheel 1 according to embodiments of the current invention.

Figure 14:
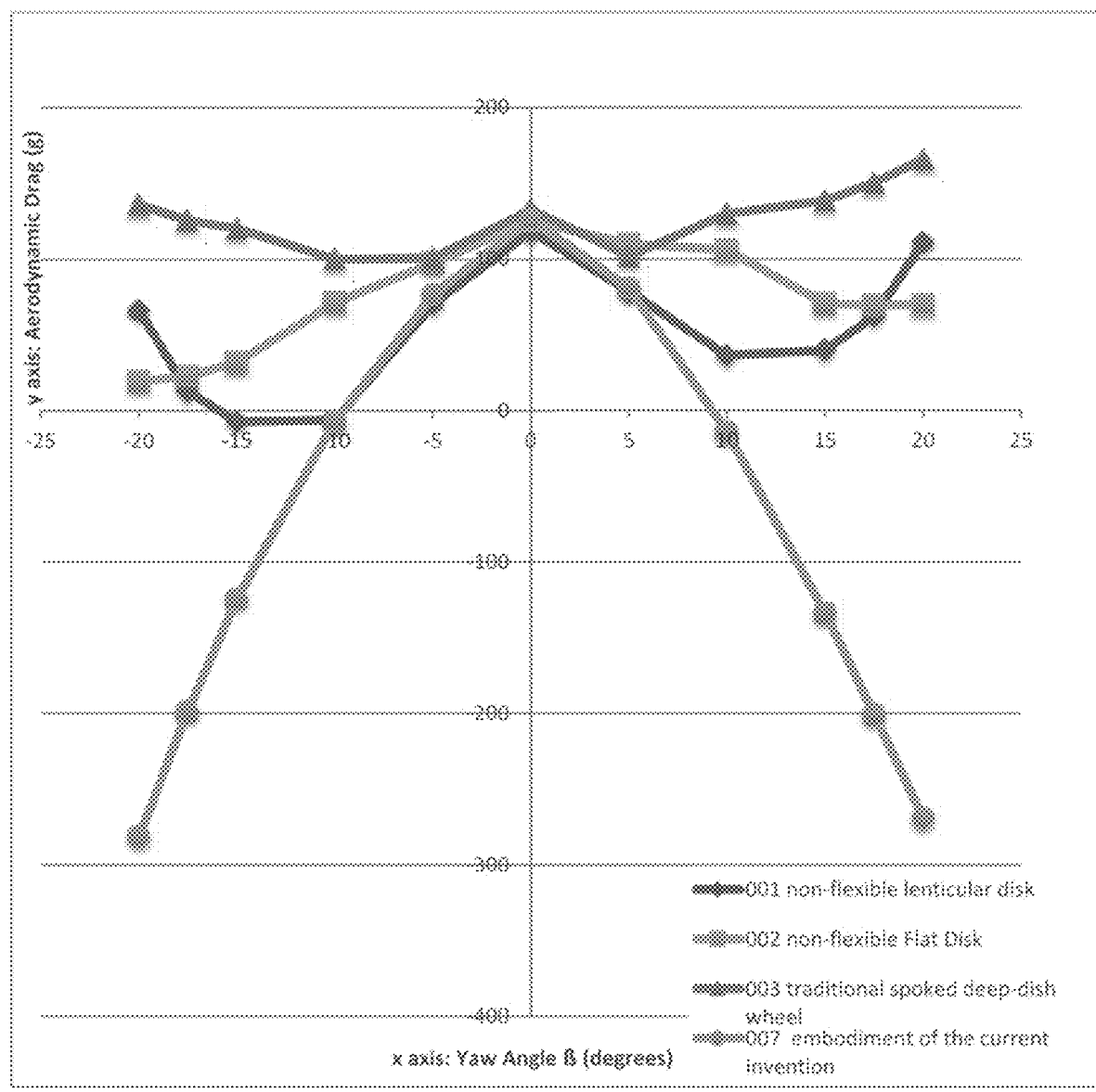
FIG. 14 depicts a chart illustrating data (yaw angle (ß) (degrees) on x axis and aerodynamic drag (g) on the y axis) of wheels currently on the market available to consumers, compared to an embodiment of the current invention, according to non-limiting embodiments.

Attention is now directed to FIG. 14 which graphically demonstrates the preferable acrodynamics under more significant wind conditions, offered by a wheel 1 according to an embodiment of the current invention as compared to other commercially-available wheels. The data depicted in FIG. 14 was collected in a US wind tunnel, where an embodiment of the current invention and other commercially-available wheels (non-flexible lenticular disc wheel, non-flexible flat disc wheel, traditional spoked deep-dish wheel) were run through wind tunnel tests. As described above, increased stall angles provide greater aerodynamic efficiency through a greater range of conditions. As is illustrated in FIG. 14, a wheel 1, which is an embodiment of the current invention, has negative aerodynamic drag values through a greater range of yaw angles, including yaw angles where the aerodynamic drag of wheels currently on the market begins to increase. The point where the graph lines for the wheels currently on the market begins to increase represents each wheel's respective stall angles and the point where the airflow has changed from laminar to non-laminar airflow. In comparison, the aerodynamic drag of an embodiment of the current invention continues to decrease (becoming a larger negative value) as the yaw angle increases, meaning wheel 1, which is an embodiment of the current invention, does not stall through the yaw angles illustrated in FIG. 14, and airflow over the wheel 1 of an embodiment of the current invention remains laminar, contributing to an increased perception of stability by cyclists. As mentioned above, the yaw angle at which the airflow changes from laminar to non-laminar is referred to as the "stall angle." Traditional disc wheels exhibit stall angles of 8-10 degrees of yaw, while a wheel 1 according to an embodiment of this invention exhibited stall angles between 15 and 25 degrees of yaw. As mentioned previously, by increasing the stall angle of a moving object 25, the wheel 1 of an embodiment of this invention allows the moving object 25 to subject to greater yaw angles 32 while maintaining positive aerodynamics and lower drag forces.

Attention is now directed to FIG. 12. By increasing the stall angle of a moving object 25 of FIG. 12, a moving object 25 can be subject to greater yaw angles 32 while maintaining lower drag forces and more preferable acrodynamics. By reducing the conditions under which the moving object 25 will experience a stall angle, the moving object 25, which according to some embodiments is a bicycle, stays more stable and controllable as at the stall angle the forces are abrupt and turbulent, because the air flow is no longer laminar. By increasing the yaw angle 32 before the stall angle is reached, during that time air's force on moving object 25, also generates thrust in the corresponding direction of thrust 24, which effectively pushes moving object 25 forward. The force of this forward thrust can add as much as 10% of the cyclist's total power output.

As would be understood by those skilled in the art, wind tunnel testing is the "gold standard" for determining aerodynamics of vehicular equipment, including wheels for bicycles and other vehicles. Gust absorption of a wheel 1 according to an embodiment of the current invention was tested and observed in the wind tunnel through gust simulation. These simulations were carried out in wind tunnels in the US, but could be carried out in wind tunnels in any location, as is known to those skilled in the art. A board larger than the dimensions of the wheel 1 itself was quickly lifted from a flat position to an upright position. This board was positioned at a deflection angle perpendicular to the wheel 1 to simulate a strong sudden cross wind gust. Video and photo stills were taken to record the reaction by the wheel 1. Under gusts, the first air engaging flexible and aerodynamic surface 2-1 and second air engaging flexible and aerodynamic surface 2-2 moved laterally to the leeward side as much as 45 mm.

In road testing, cyclists could not discern any difference in the stability or comfort when using an embodiment of the current invention versus regular spoked wheels (which are commonly known to be stable and comfortable). While providing similar comfort and stability to regular spoked wheels, a wheel 1 which is an embodiment of the current invention offered significant aerodynamic advantages over such regular spoked wheels. This testing included cyclists who are small and lightweight and who would typically not consider using a disc wheel, due to the limitations of the previously disclosed non-flexible, traditional disc wheels. Such road testing demonstrated that the wheels 1, according to an embodiment of the current invention, offer significant aerodynamic advantages without all the disadvantages of wheels currently commercialized and available to those skilled in the art.

As part of further testing of cyclists, a retired professional triathlete and several masters athletes were asked for feedback on the acceleration, speed, stability in windy conditions and power transfer of the wheel 1, according to embodiments of the current invention, compared to other traditional wheels. In all cases, the athletes commented that their speed and stability improved significant with a wheel 1, according to an embodiment of the current invention, as compared to traditional wheels. Cyclists reported a sensation of being pushed or propelled forward by the wheel 1, according to an embodiment of the current invention, despite wind forces that would typically impede forward movement using conventional wheels.

Further testing involved 15 professional cyclists, who compete worldwide throughout the year. The cyclists were asked to compare the acceleration speed, stability in windy conditions and power transfer of wheel 1, which was an embodiment of the current invention to any other traditional disc wheel they have used. In response to the testing and questions, a statistically significant percentage of professional cyclists responded that a wheel 1, which was an embodiment of the current invention, was light, flexible and stable in cross winds.

Figure 6:
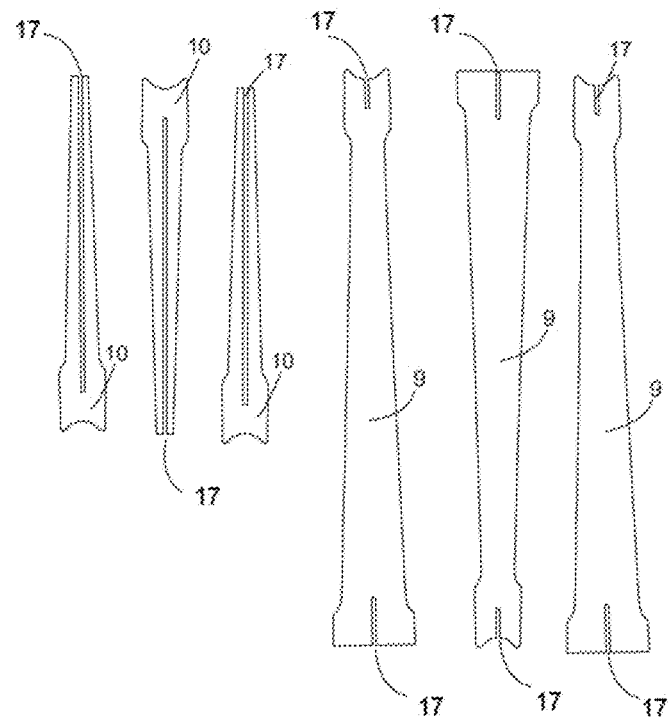
FIG. 6 depicts a side elevation view of the laterally oriented interlocking cross ribs components of a wheel, prior to interlocking, according to non-limiting embodiments.
Figure 7:
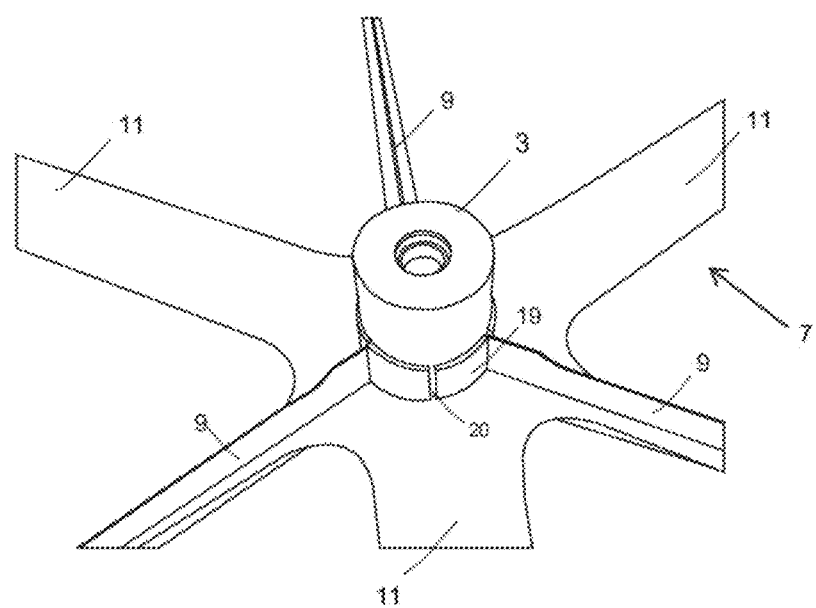
FIG. 7 depicts a perspective view of interlocking components of a wheel, according to non-limiting embodiments.

Attention is now drawn to FIGS. 1 to 8, which depict a non-limiting embodiment of a wheel 1. Wheel 1 includes inner hub 3 (FIGS. 1A and 1B; FIG. 2; FIG. 3A, FIGS. 4A and 4B; FIG. 7; FIGS. 8A and 8B), rim 15 (FIGS. 3A and 3B; FIGS. 8A and 8B), attachment assembly configured to couple rim 15 to inner hub 3, first air engaging flexible and aerodynamic surface 2-1 (FIGS. 1A and 1B; FIG. 2; FIGS. 8A and 8B) and second air engaging flexible and aerodynamic surface 2-2 (FIGS. 1A and 1B; FIG. 2), each air engaging flexible and aerodynamic surface 2 overlaying the attachment assembly configured to couple rim 15 to inner hub 3, such that the two surfaces are axially opposed. Inner hub 3 is located radially inward from rim 15. The radially medial edges of first air engaging flexible and aerodynamic surface 2-1 and second air engaging flexible and aerodynamic surface 2-2 are operatively connected proximate to inner hub 3 and the radially distal perimeter edges of first air engaging flexible and aerodynamic surface 2-1 and second air engaging flexible and aerodynamic surface 2-2 are operatively connected proximal to rim 15, creating two opposed, axial surfaces of wheel 1.

Figure 3A:
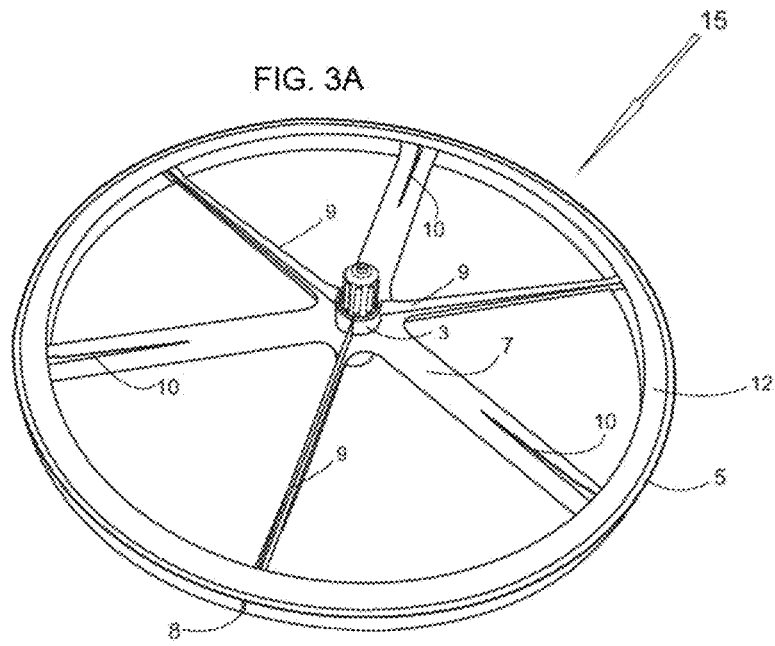
FIG. 3A depicts a perspective view of the partially assembled internal structure of a wheel, including rim, inner hub, attachment assembly configured to couple rim to inner hub (multi-arm direct-drive plate and laterally oriented interlocking cross ribs), according to non-limiting embodiments.
Figure 3B:
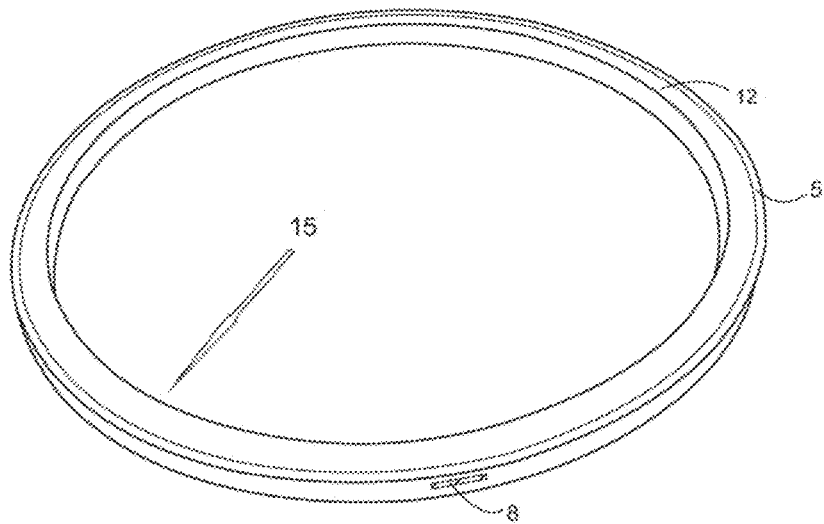
FIG. 3B depicts a perspective view of a rim of a wheel which can be either closed in structure or open (to accept the multi-arm direct-drive plate and laterally oriented interlocking cross ribs), according to non-limiting embodiments.

According to certain embodiments, inner hub 3 (FIGS. 1A and 1B; FIG. 2; FIGS. 3A and 3B; FIGS. 4A and 4B), comprises a generally cylindrical body (with a ribbed outer surface 19 and splined 20 outer surface) with a central aperture (FIGS. 4A and 4B) which enables wheel 1 to be fixed to the end of the rear dropouts or front fork of a bicycle in a known manner. For example, according to some embodiments, inner hub 3 is rotatably mounted to a pin via ball bearings; however, any suitable means of mounting inner hub 3 so as to rotate about a pin is contemplated.

According to some embodiments, the open structure rim 15 (FIG. 3B) is comprised of a composite material (such as carbon fibre, fibreglass, or Kevlar®) and set in a resin (such as epoxy, thermoplastic, nylon, or ceramic). The outer circumferential surface of rim 15 may be grooved to seat a tire 4 (FIGS. 1A and 1B; FIG. 2), and according to some embodiments, there is a raised brake track 5 (FIGS. 1A and 1B; FIGS. 3A and 3B) on each axially opposed radially distal lateral perimeter of rim 15 to help protect the edge of first air engaging flexible and aerodynamic surface 2-1 and second air engaging flexible and aerodynamic surface 2-2 from accidental contact with a misadjusted brake pad.

As would be known to those skilled in the art, the braking mechanism can be varied or omitted entirely. Variations could include a raised brake track 5 (FIGS. 1A and 1B) on each axially opposed radially distal lateral perimeter of rim 15 (as described above), or alternatively a disc-brake mechanism located proximal to the inner hub 3. If no raised brake track 5 is required, first air engaging flexible and aerodynamic surface 2-1 and second air engaging flexible and aerodynamic surface 2-2 may be operatively connected more proximal to the radially distal perimeter of the rim 15.

As is known to those skilled in the art, the inner hub 3 used may be varied based on the braking mechanism or for other reasons. Possible inner hub 3 variations include a rear-wheel disc brake hub, a front-wheel disc brake hub, a rear-wheel non-disc brake hub, a front-wheel non-disc brake hub or a free-wheel hub, or a combination of the foregoing.

As is known to those skilled in the art, the shape of rim 15 can also be varied. Variations can include the open structure shape (as described above), which has the advantage of making installation of first air engaging flexible and aerodynamic surface 2-1 and second air engaging flexible and aerodynamic surface 2-2 easier and faster allowing the material to sit completely flat from rim 15 to inner hub 3. Alternatively, rim 15 can be a closed-structure where all walls of the rim 15 connect. As is known to those skilled in the art, different variations of the shape of rim 15 permit various types of tire 4, including clincher tires, tubeless tires and tubular tires, to be mounted on rim 15. Similarly, the shape of rim 15 may be single-walled or double-walled.

According to certain embodiments, the attachment assembly configured to couple rim 15 to inner hub 3 may comprise a multi-arm central drive plate 7 (FIG. 1B; FIG. 2; FIG. 5; FIG. 7), which may optionally include laterally oriented interlocking cross ribs 9, 10 (FIG. 1B; FIG. 3A; FIG. 6; FIG. 7). Multi-arm central drive plate 7 may have a radially medial aperture to engage inner hub 3. FIGS. 3A and 6 illustrate laterally oriented, interlocking cross ribs 9, 10 which, according to certain embodiments, are constructed of the before mentioned composite material, namely, carbon fibre, fibreglass, or Kevlar® and set in a resin (such as epoxy, thermoplastic, nylon, or ceramic). Laterally oriented, interlocking cross ribs 9, 10, may be cut from a flat sheet/plate of material and each piece may have a receiving slit (depicted as slits 17 in FIG. 6). Slits 17 allow all the pieces to interlock creating a generally "+" shape (FIG. 7), which tends to yield a much stronger overall structure. According to some embodiments, laterally oriented, interlocking cross ribs 9, 10 may be bonded using a high strength epoxy hysol adhesive to further increase strength.

According to certain embodiments, the attachment assembly configured to couple rim 15 to inner hub 3 may be comprised of multi-arm central drive plate 7 (FIG. 7) which may: (i) couple to inner hub 3 by coupling tabs 16 (FIG. 5) with the splines/grooves 19, 20 of inner hub 3 (which serves as a central keystone, interlocking the entire structure together), and (ii) couple to rim 15 by coupling protrusions 18 (FIG. 5) on multi-arm central drive plate 7 (FIG. 5) with accepting slots 8 (FIGS. 3A and 3B) of rim 15. These interacting points may be further reinforced with an epoxy adhesive. The previously described structure comprises the attachment assembly configured to couple rim 15 to inner hub 3 in this embodiment of wheel 1 (FIG. 3A). According to certain embodiments, the orientation of the attachment assembly configured to couple rim 15 to inner hub 3 may be further adapted to accommodate cyclist weight/power output by varying the number of arms 11 of multi-arm central drive plate 7 to accommodate the manufacturers and cyclist's requirements.

As is known to those skilled in the art, the attachment assembly configured to couple rim 15 to inner hub 3 can be varied, compared to the structures described herein. The attachment assembly configured to couple rim 15 to inner hub 3 may be comprised of traditional metal spokes (where a plurality of spokes extend radially from inner hub 3 to rim 15) or composite arms similar to a three, four, five, six or eight spoke carbon wheel. Variations could include using several interlocking parts (as described above). It is also possible to achieve this structure with a singular or multiple (i.e., two or more) molds, or a suitable combination of manufacturing techniques. With the present invention, those skilled in the art need not focus on the attachment assembly configured to couple rim 15 to inner hub 3 (since the flexibility of first air engaging flexible and aerodynamic surface 2-1 and second air engaging flexible and aerodynamic surface 2-2 are what creates the aerodynamic profile), and therefore, various attachment assemblies configured to couple rim 15 to inner hub 3 can be utilized to optimize lightness, stiffness and efficiency, in transferring rotation forces from inner hub 3 to rim 15, without compromising aerodynamics.

To complete this embodiment of wheel 1, first air engaging flexible and aerodynamic surface 2-1 and second air engaging flexible and aerodynamic surface 2-2 may be installed, one on each axial side of wheel 1, following the same steps for each side, such that first air engaging flexible and aerodynamic surface 2-1 forms one axial surface of wheel 1 and second air engaging flexible and aerodynamic surface 2-2 forms a second surface of wheel 1.

According to certain embodiments, inner hub washers 6 (FIG. 1B) with an engaged fit may be placed around inner hub 3, on each axial side of inner hub 3. The radially medial edges of first air engaging flexible and aerodynamic surface 2-1 and second air engaging flexible and aerodynamic surface 2-2, may be operatively connected proximal to inner hub 3, through an operative connection to inner hub washers 6 (FIG. 1B). The radially distal perimeter edges of first air engaging flexible and aerodynamic surface 2-1 and second air engaging flexible and aerodynamic surface 2-2 may be operatively connected proximal to rim 15, through an operative connection to the lateral, perimeter surfaces of rim 12 (FIG. 1B).

First air engaging flexible and aerodynamic surface 2-1 and second air engaging flexible and aerodynamic surface 2-2, which surfaces according to some embodiments are comprised of a shrink wrap film, may be cut to size to extend from inner hub 3, right to the circumferential perimeter of rim 15. An opening may be provided near the center of first air engaging flexible and aerodynamic surface 2-1 and second air engaging flexible and aerodynamic surface 2-2 to form the radially medial edges of first air engaging flexible and aerodynamic surface 2-1 and second air engaging flexible and aerodynamic surface 2-2, to accommodate inner hub 3. An adhesion promoter may be applied to the lateral, perimeter surfaces of the rim 12 (not including any brake track 5 at the radially distal, lateral perimeter edge of rim 15, if included in such an embodiment). The adhesion promoter may act as a temporary tacking agent that temporarily tacked first air engaging flexible and aerodynamic surface 2-1 and second air engaging flexible and aerodynamic surface 2-2 around the lateral, perimeter surfaces of the rim 12, so that first air engaging flexible and aerodynamic surface 2-1 and second air engaging flexible and aerodynamic surface 2-2 may be re-positioned as necessary during the ironing onto rim 15.

According to certain embodiments, first air engaging flexible and aerodynamic surface 2-1 and second air engaging flexible and aerodynamic surface 2-2 are each comprised of a shrink wrap film with a plastic outer layer and a pressure sensitive inner adhesive layer. The radially medial edge of said shrink wrap film may be adhered to inner washer 6 and then the radially distal perimeter edge of the shrink wrap film may be adhered to lateral, perimeter surface of the rim 12 using a hobby iron, heat gun or like device. Any means to adhere shrink wrap film could be used. The pressure sensitive inner adhesive layer may be heat-activated, with a tack temperature point that is just below its shrink point temperature.

Preferably, on one axial side of wheel 1, a second washer 14 may be heat applied to the shrink wrap film, comprising first air engaging flexible and aerodynamic surface 2-1, directly over the opening to tire valve 13, proximal to rim 15, creating an access point for a bicycle tire pump, in order to pump tire 4 to the desired air pressure (FIGS. 1A and 1B).

According to certain embodiments, once adhered, heat may be applied (with either a hobby iron or a heat gun) to first air engaging flexible and aerodynamic surface 2-1 and second air engaging flexible and acrodynamic surfaces 2-2, causing them to shrink, thus forming a continuous surface between lateral, perimeter surface of the rim 12 and inner hub washer 6 on both axial sides of wheel 1. The tightened/heat-shrunk film sits freely above laterally oriented, interlocking cross ribs 9, 10 which allows the leeward migration of first air engaging flexible and aerodynamic surface 2-1 and second air engaging flexible and aerodynamic surfaces 2-2 under external forces like the wind, creating the beneficial airfoil shape and resulting thrust force on the vehicle. The first air engaging flexible and aerodynamic surface 2-1 and second air engaging flexible and aerodynamic surfaces 2-2 were not affixed with such a degree of tension that the surfaces became inflexible and incapable of leeward migration. "Tension" is defined herein as the pulling force on a material.

Attention is directed to FIGS. 8A and 8B which illustrates the adaptation (which according to certain embodiments may be a leeward migration) and change in shape of first air engaging flexible and acrodynamic surface 2-1 and second air engaging flexible and acrodynamic surfaces 2-2, when subject to an external force such as an apparent wind 22 force. FIG. 8A illustrates a wheel 1, according to an embodiment of the current invention, that is not subject to an external force. FIG. 8B illustrates a wheel 1, according to an embodiment of the current invention, that is subject to an external force (an apparent wind 22 force). The change in shape of the first air engaging flexible and aerodynamic surface 2-1 and second air engaging flexible and acrodynamic surfaces 2-2 between FIG. 8A and FIG. 8B demonstrate the adaptation of first air engaging flexible and aerodynamic surface 2-1 and second air engaging flexible and aerodynamic surfaces 2-2 to external forces like the wind, according to non-limiting embodiments.

The means and method of (i) operatively connecting the radially medial edges of first air engaging flexible and aerodynamic surface 2-1 and second air engaging flexible and aerodynamic surface 2-2 proximal to inner hub 3 and (ii) operatively connecting the radially distal perimeter edges of first air engaging flexible and acrodynamic surface 2-1 and second air engaging flexible and aerodynamic surface 2-2 proximal to rim 15 may also be varied. According to non-limiting embodiments, the radially distal perimeter edges of the first air engaging flexible and aerodynamic surface 2-1 and second air engaging flexible and aerodynamic surface 2-2 may be adhered to the applicable lateral, perimeter surfaces of the rim 12 by means including cement, tape, or double-sided tape located on the radially distal perimeter edges of first air engaging flexible and aerodynamic surface 2-1 and second air engaging flexible and aerodynamic surface 2-2.

According to non-limiting embodiments, mechanical means may be used to operatively connect the radially medial edges of first air engaging flexible and aerodynamic surface 2-1 and second air engaging flexible and aerodynamic surface 2-2 proximal to inner hub 3, or operatively connect the radially distal perimeter edges of first air engaging flexible and aerodynamic surface 2-1 and second air engaging flexible and aerodynamic surface 2-2 proximal to rim 15. For example, to operatively connect the radially distal perimeter edges of first air engaging flexible and aerodynamic surface 2-1 and second air engaging flexible and aerodynamic surface 2-2 proximal to rim 15, an elastic 33 may be adhered around the circumference of the radially distal perimeter edges of the first air engaging flexible and aerodynamic surface 2-1 and second air engaging flexible and aerodynamic surface 2-2 which engages over a circumferential ridge 36 on each axial side of wheel 1, located around each lateral, perimeter surface of the rim 12 or around each axial side of the radially distal perimeter of rim 15.

Attention is now directed to FIGS. 15A and 15B which depicts a non-limiting embodiment of a mechanical means of operatively connecting the radially distal perimeter edges of first air engaging flexible and aerodynamic surface 2-1 and second air engaging flexible and aerodynamic surface 2-2 proximal to rim 15. FIG. 15A depicts an air engaging flexible and acrodynamic surface 2, laid flat, prior to assembling wheel, according to non-limiting embodiments. Spline 29 is depicted as adhered around the circumference of the radially distal perimeter edge of an air engaging flexible and aerodynamic surface 2. According to certain embodiments, spline 29 may be adhered around the circumference of the radially distal perimeter edge of each of first air engaging flexible and aerodynamic surface 2-1 and second air engaging flexible and aerodynamic surface 2-2. According to certain embodiments, to assemble wheel 1, spline 29 (FIG. 15B) may be coupled with circumferential grooves 30 in rim 15. FIG. 15B depicts an embodiment where spline 29 is adhered to radially distal perimeter edge of first air engaging flexible and aerodynamic surface 2-1, prior to being engaged with groove 30 in rim 15. Second air engaging flexible and acrodynamic surface 2-2 is depicted with spline 29 engaged with groove 30 (such that groove 30 is no longer visible), forming an assembled axial surface of wheel 1, according to non-limiting embodiments. Spline 29 may be comprised of various materials known in the art including extruded nylon. The position of groove 30 in rim 15 may also be varied. Where an embodiment of wheel 1 includes a brake track 5 (FIGS. 1A and 1B), groove 30 may be positioned in the lateral, perimeter surfaces of rim 12 (FIG. 1B). Where an embodiment of wheel 1 does not require a brake track 5, groove 30 may be positioned more proximal to the radially distal perimeter of the rim 15.

As is known to those skilled in the art, it is possible to use a variety of means of manufacture to construct wheel 1. A previously manufactured and coupled inner hub 3, rim 15, and attachment assembly configured to couple rim 15 to inner hub 3, may be used and first air engaging flexible and aerodynamic surface 2-1 and second air engaging flexible and acrodynamic surfaces 2-2 installed on a pre-existing structure. The installation of first air engaging flexible and aerodynamic surface 2-1 and second air engaging flexible and aerodynamic surfaces 2-2 also need not be done by hand. Machines may be used to install first air engaging flexible and aerodynamic surface 2-1 and second air engaging flexible and acrodynamic surfaces 2-2.

As is known to those skilled in the art, it is possible to use a variety of materials to construct first air engaging flexible and aerodynamic surface 2-1 and second air engaging flexible and acrodynamic surface 2-2, such as those without the adhesive built in to the backing of the shrink wrap film itself, or other materials such as latex, rubber, stretch film, silicone or combinations thereof. Materials with some degree of elasticity, that permit deformation under external forces such as the wind, with the ability to return to a neutral position, can be used.

The degree of flexibility of first air engaging flexible and acrodynamic surface 2-1 and second air engaging flexible and aerodynamic surface 2-2 may also be varied. In circumstances where low yaw angles are experienced, first air engaging flexible and aerodynamic surface 2-1 and second air engaging flexible and aerodynamic surface 2-2 may be less flexible. In circumstances where there are variable wind directions and greater yaw angles may be experienced, first air engaging flexible and aerodynamic surface 2-1 and second air engaging flexible and aerodynamic surface 2-2 may be more flexible. The variation in the degree of flexibility may be achieved by different means including using different materials for first air engaging flexible and aerodynamic surface 2-1 and second air engaging flexible and aerodynamic surface 2-2 or by installing first air engaging flexible and aerodynamic surface 2-1 at a different degree of tension from that of second air engaging flexible and aerodynamic surface 2-2, provided some flexibility is maintained. The material used for first air engaging flexible and aerodynamic surface 2-1 may optionally be the same as or a different material than that used for second air engaging flexible and aerodynamic surface 2-2. Similarly, first air engaging flexible and aerodynamic surface 2-1 may optionally be installed at the same tension or a different tension than second air engaging flexible and aerodynamic surface 2-2.

Figure 16:
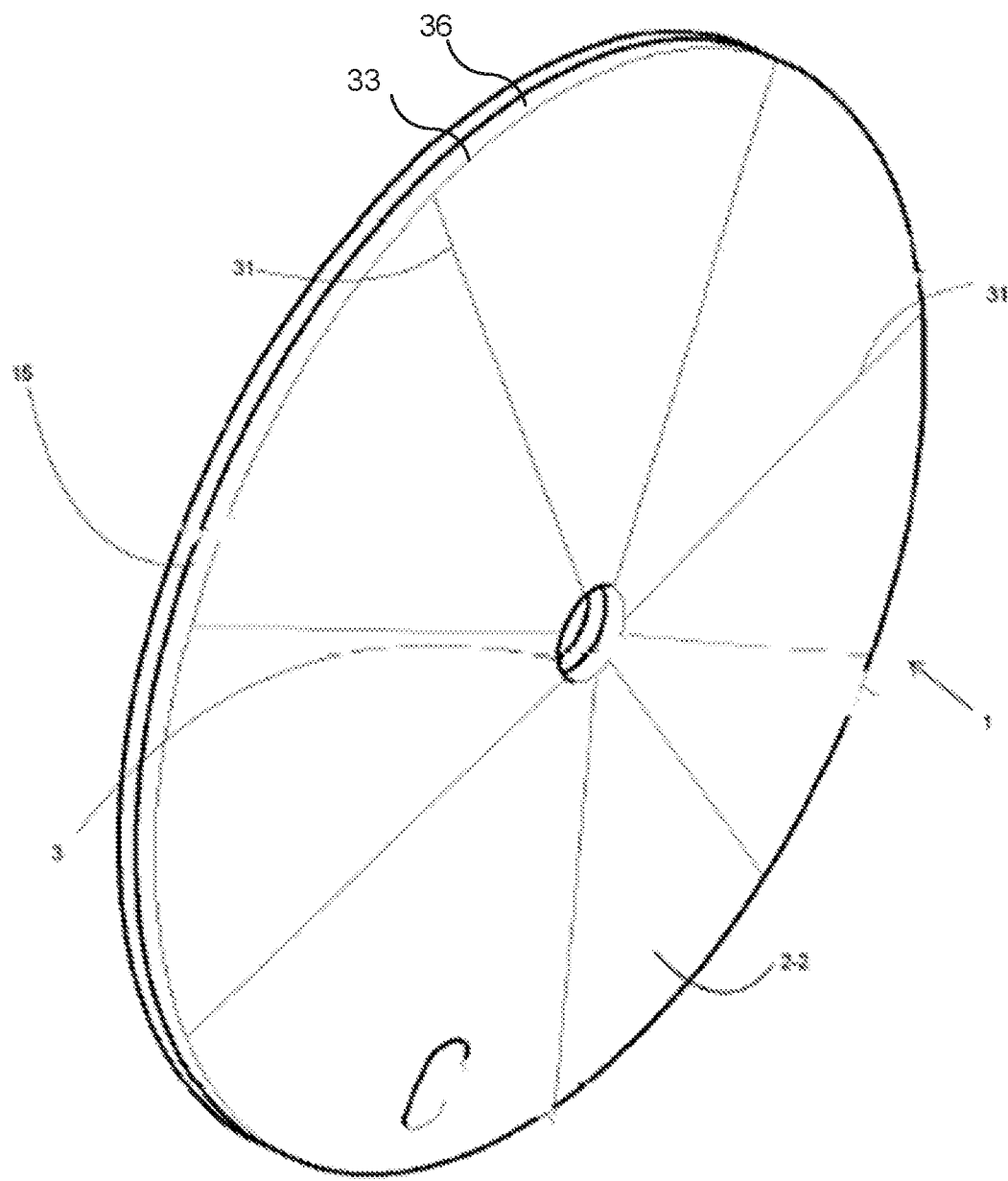
FIG. 16 depicts a diagrammatic representation of a side perspective view of a wheel, according to non-limiting embodiments.
Figure 17:
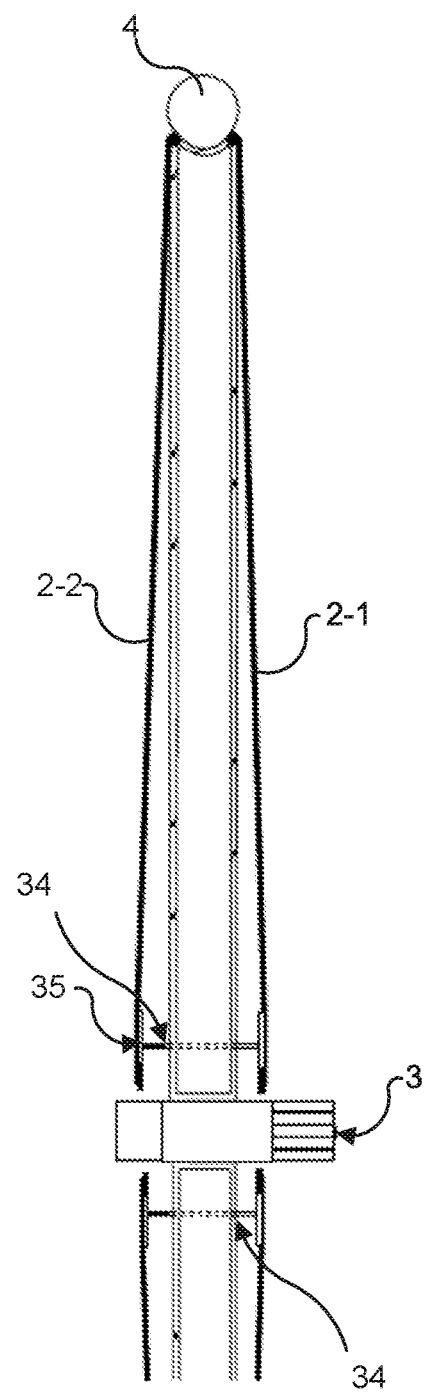
FIG. 17 depicts a diagrammatic representation of a cross-sectional front view of the internal structure of a wheel, according to non-limiting embodiments.

Attention is now directed to FIG. 16 which depicts second air engaging flexible and aerodynamic surface 2-2 mounted onto wheel 1, according to non-limiting embodiments. According to the embodiment depicted in FIG. 16, the flexibility of second air engaging flexible and aerodynamic surface 2-2 may be further increased by including flexible joints 31 in second air engaging flexible and aerodynamic surface 2-2. Flexible joints 31 may extend radially from the radially medial edge of second air engaging flexible and aerodynamic surface 2-2, proximal to inner hub 3, to the radially distal perimeter edge of second air engaging flexible and aerodynamic surface 2-2, proximal to rim 15. The number and relative positioning of flexible joints 31 may be varied. Flexible joints 31 may also be included on first air engaging flexible and aerodynamic surface 2-1, as installed on the axially opposed side of wheel 1 from second air engaging flexible and aerodynamic surface 2-2.

Those skilled in the art would have means available to them to test the flexibility and elasticity of proposed materials to be used. For example, latex and rubber materials are generally known to have less elasticity and shrink wrap film and other materials are known to have more elasticity.

The terms "flexible" and "flexibility" are used herein. For clarity, "flexible" is used to describe a material/surface that is temporarily deformable. "Flexible" is understood as describing the ability to adapt and conform to a force which is applied to the material/surface, where such adaptation is temporary and the material/surface returns to a neutral position once such a force is no longer applied.

According to certain embodiments, first air engaging flexible and aerodynamic surface 2-1 and second air engaging flexible and aerodynamic surface 2-2 are capable of moving concurrently and laterally, in a leeward direction.

Attention is directed to FIGS. 13A and 13B which depict an embodiment of the means by which first air engaging flexible and aerodynamic surface 2-1 and second air engaging flexible and aerodynamic surface 2-2 are capable of moving concurrently and laterally, in a leeward direction. According to certain embodiments, the concurrent and lateral movement, in a leeward direction may be achieved by attaching an internal sliding mechanism 26 (FIGS. 13A and 13B) to the attachment assembly configured to couple rim 15 to inner hub 3 (which according to certain embodiments may comprise multi-arm central drive plate 7) at a location proximal to inner hub 3. According to certain embodiments, internal sliding mechanism 26 may be comprised of linear bearings 28 which may be operatively connected to multi-arm central drive plate 7 at a location proximal to inner hub 3, in a position axially perpendicular to multi-arm central drive plate 7. Circular face plates 27 may be operatively attached to each axially-opposed end of the linear bearings 28. The radially medial edges of first air engaging flexible and aerodynamic surface 2-1 and second air engaging flexible and aerodynamic surface 2-2 may be operatively attached to the respective outer axial surface of the two axially opposed circular face plates 27. The relative position of internal sliding mechanism 26 between FIG. 13A and FIG. 13B is illustrative of internal sliding mechanism 26 and its ability to move laterally, independently from inner hub 3, rim 15 and attachment assembly configured to couple rim 15 to inner hub 3 (which according to certain embodiments may comprise multi-arm central drive plate 7). When the radially medial edges of first air engaging flexible and aerodynamic surface 2-1 and second air engaging flexible and aerodynamic surface 2-2 are operatively attached to the respective outer axial surface of circular face plates 27, the lateral movement of internal sliding mechanism 26 enables the concurrent and lateral movement of first air engaging flexible and aerodynamic surface 2-1 and second air engaging flexible and aerodynamic surface 2-2, independently from inner hub 3, rim 15 and attachment assembly configured to couple rim 15 to inner hub 3.

Various internal sliding mechanisms may be used to enable the concurrent and lateral movement, in a leeward direction of first air engaging flexible and aerodynamic surface 2-1 and second air engaging flexible and aerodynamic surface 2-2. According to certain embodiments, the internal sliding mechanism may be comprised of a free-floating cylinder 34 positioned around inner hub 3, such that the circular end-surfaces 35 of the free-floating cylinder 34 face the outer axial sides of wheel 1. The radially medial edges of first air engaging flexible and aerodynamic surface 2-1 and second air engaging flexible and aerodynamic surface 2-2 may be operatively attached to the axial end-surfaces 35 of the free-floating cylindrical structure.

The description above focuses on an example of an aerodynamic wheel 1, namely, a bicycle wheel. As would be understood by those skilled in the art, other vehicles, such as handcycles, recumbent bicycles, wheelchairs, would also benefit from the wheels 1 of this invention. The various vehicles which would benefit from such wheels 1, may be self-propelled, non-motorized (including vehicles powered by human force) or powered by other means known in the art.

Persons skilled in the art will appreciate that there are yet more alternative implementations and modifications possible, and that the above examples are only illustrations of one or more implementations. The scope, therefore, is only to be limited by the claims appended hereto.

Interpretation

It will also be understood that for the purposes of this application, "at least one of X, Y, and Z" or "one or more of X, Y, and Z" language can be construed as X only, Y only, Z only, or any combination of two or more items X, Y, and Z (e.g., XYZ, XYY, YZ, ZZ).

In the present application, components may be described as being "configured to" or "enabled to" perform one or more functions. Generally, it is understood that a component that is configured to or enabled to perform a function is configured to or enabled to perform the function, or is suitable for performing the function, or is adapted to perform the function, or is operable to perform the function, or is otherwise capable of performing the function.

Additionally, components in the present application may be described as being "operatively connected to", "operatively coupled to", and the like, to other components. It is understood that such components are connected or coupled to each other in a manner to perform a certain function. It is also understood that "connections", "coupling" and the like, as recited in the present application include direct and indirect connections between components.

References in the application to "one embodiment", "an embodiment", "an implementation", "a variant", etc., indicate that the embodiment, implementation or variant described may include a particular aspect, feature, structure, or characteristic, but not every embodiment, implementation or variant necessarily includes that aspect, feature, structure, or characteristic. Moreover, such phrases may, but do not necessarily, refer to the same embodiment referred to in other portions of the specification. Further, when a particular aspect, feature, structure, or characteristic is described in connection with an embodiment, it is within the knowledge of one skilled in the art to affect or connect such module, aspect, feature, structure, or characteristic with other embodiments, whether or not explicitly described. In other words, any module, element or feature may be combined with any other element or feature in different embodiments, unless there is an obvious or inherent incompatibility, or it is specifically excluded.

It is further noted that the claims may be drafted to exclude any optional element. As such, this statement is intended to serve as antecedent basis for the use of exclusive terminology, such as "solely", "only", and the like, in connection with the recitation of claim elements or use of a "negative" limitation. The terms "preferably", "preferred", "prefer", "optionally", "may", and similar terms are used to indicate that an item, condition or step being referred to is an optional (not required) feature of the invention.

The singular forms "a", "an", and "the" include the plural reference unless the context clearly dictates otherwise. The singular form "wheel" includes plural "wheels" and vice versa, unless the context clearly dictates otherwise. The term "and/or" means any one of the items, any combination of the items, or all of the items with which this term is associated. The phrase "one or more" is readily understood by one of skill in the art, particularly when read in context of its usage.

The term "about" can refer to a variation of +5%, +10%, +20%, or +25% of the value specified. For example, "about 50" percent can in some embodiments carry a variation from 45 to 55 percent. For integer ranges, the term "about" can include one or two integers greater than and/or less than a recited integer at each end of the range. Unless indicated otherwise herein, the term "about" is intended to include values and ranges proximate to the recited range that are equivalent in terms of the functionality of the composition, or the embodiment.

As will be understood by one skilled in the art, for any and all purposes, particularly in terms of providing a written description, all ranges recited herein also encompass any and all possible sub-ranges and combinations of sub-ranges thereof, as well as the individual values making up the range, particularly integer values. A recited range includes each specific value, integer, decimal, or identity within the range. Any listed range can be easily recognized as sufficiently describing and enabling the same range being broken down into at least equal halves, thirds, quarters, fifths, or tenths. As a non-limiting example, each range discussed herein can be readily broken down into a lower third, middle third and upper third, etc.

As will also be understood by one skilled in the art, all language such as "up to", "at least", "greater than", "less than", "more than", "or more", and the like, include the number recited and such terms refer to ranges that can be subsequently broken down into sub-ranges as discussed above. In the same manner, all ratios recited herein also include all sub-ratios falling within the broader ratio.

What is claimed is:

1. A wheel for a vehicle comprising:
   a rim;
   an inner hub located radially inward from the rim;
   an attachment assembly configured to couple the rim to the inner hub;
   a first air engaging flexible and aerodynamic surface overlaying the attachment assembly configured to couple the rim to the inner hub, wherein a radially inner edge of the first air engaging flexible and aerodynamic surface is operatively connected proximate to the inner hub, and a radially distal perimeter edge of the first air engaging flexible and aerodynamic surface is operatively connected proximate to the rim, forming a first axial surface of the wheel; and
   a second air engaging flexible and aerodynamic surface overlaying the attachment assembly configured to couple the rim to the inner hub, wherein a radially inner edge of the second air engaging flexible and aerodynamic surface is operatively connected proximate to the inner hub, and a radially distal perimeter edge of the second air engaging flexible and aerodynamic surface is operatively connected proximate to the rim, forming a second axial surface of the wheel, which is axially opposed to the said first surface of the wheel;
   wherein said first air engaging flexible and aerodynamic surface and said second air engaging flexible and aerodynamic surface are adaptable to external forces and change shape when subject to the external forces thereby resulting in an aerodynamic shape formed by said first air engaging flexible and aerodynamic surface and said second air engaging flexible and aerodynamic surface, the aerodynamic shape being an airfoil shape having a high side on a leeward side of the wheel.

2. The wheel of claim 1, wherein the external forces comprise apparent wind.

3. The wheel of claim 1, wherein the attachment assembly configured to couple the rim to the inner hub comprises: a plurality of spokes extending radially from the inner hub to the rim; a multi-arm central drive plate and laterally oriented, interlocking cross ribs; or between two and eight arms.

4. The wheel of claim 1, wherein the rim is configured to operatively engage a tubular tire, a tubeless tire or a clincher tire.

5. The wheel of claim 1, wherein the rim further comprises a brake track.

6. The wheel of claim 1, wherein the inner hub comprises a rear-wheel disc brake hub, a front-wheel disc brake hub, a rear-wheel non-disc brake hub, a front-wheel non-disc brake hub, a free-wheel hub or a combination thereof.

7. The wheel of claim 1, wherein the first air engaging flexible and aerodynamic surface and the second air engaging flexible and aerodynamic surface are comprised of rubber, silicone, latex, shrink wrap film, stretch film, or a combination thereof.

8. The wheel of claim 1, wherein the first air engaging flexible and aerodynamic surface and the second air engaging flexible and aerodynamic surface are of variable thickness.

9. The wheel of claim 1, wherein the tension of the first air engaging flexible and aerodynamic surface is different from the tension of the second air engaging flexible and aerodynamic surface.

10. The wheel of claim 1, wherein the first air engaging flexible and aerodynamic surface and the second air engaging flexible and aerodynamic surface are mechanically coupled to the attachment assembly configured to couple the rim to the inner hub.

11. The wheel of claim 1, wherein the radially distal perimeter edges of each of the first air engaging flexible and aerodynamic surface and the second air engaging flexible and aerodynamic surface are operatively connected proximate to the rim by:
   an elastic affixed to the radially distal perimeter edges of each of the first air engaging flexible and aerodynamic surface and the second air engaging flexible and aerodynamic surface, wherein the elastic couples with a circumferential ridge on each axial side of the rim; or a chemical adhesive.

12. The wheel of claim 1, wherein the radially distal perimeter edges of each of the first air engaging flexible and aerodynamic surface and the second air engaging flexible and aerodynamic surface are operatively connected proximate to the rim by splines operatively coupled to the radially distal perimeter edges of the first air engaging flexible and aerodynamic surface and the second air engaging flexible and aerodynamic surface, wherein the splines couple with grooves in each axial side of the rim.

13. The wheel of claim 1, wherein the vehicle is a bicycle.

14. A wheel for a vehicle comprising:
a rim;
an inner hub located radially inward from the rim;
an attachment assembly configured to couple the rim to the inner hub;
a first air engaging flexible and aerodynamic surface overlaying the attachment assembly configured to couple the rim to the inner hub, wherein a radially inner edge of the first air engaging flexible and aerodynamic surface is operatively connected proximate to the inner hub, and a radially distal perimeter edge of the first air engaging flexible and aerodynamic surface is operatively connected proximate to the rim, forming a first axial surface of the wheel;
a second air engaging flexible and aerodynamic surface overlaying the attachment assembly configured to couple the rim to the inner hub, wherein a radially inner edge of the second air engaging flexible and aerodynamic surface is operatively connected proximate to the inner hub, and a radially distal perimeter edge of the second air engaging flexible and aerodynamic surface is operatively connected proximate to the rim, forming a second axial surface of the wheel, which is axially opposed to the said first surface of the wheel; and
an internal sliding mechanism located more proximate to the inner hub than the rim, and operatively connected to the first air engaging flexible and aerodynamic surface and the second air engaging flexible and aerodynamic surface;
wherein said first air engaging flexible and aerodynamic surface and said second air engaging flexible and aerodynamic surface are adaptable to external forces and change shape when subject to such external forces;
wherein the internal sliding mechanism is configured to enable the first air engaging flexible and aerodynamic surface and the second air engaging flexible and aerodynamic surface to move concurrently and laterally in a leeward direction; and
wherein the internal sliding mechanism is configured to move independently from the inner hub, the rim and the attachment assembly configured to couple the rim to the inner hub.

15. The wheel of claim 14, wherein the external forces comprise wind.

16. The wheel of claim 14, wherein said internal sliding mechanism is comprised of:
two axially opposed circular face plates; and
a plurality of linear bearings arranged in a parallel configuration;
wherein the circular face plates are coupled to each axial end of the linear bearings,
wherein the linear bearings are slidably engaged with the attachment assembly configured to couple the rim to the inner hub, more proximate to the inner hub than the rim;
wherein the circular face plates are operatively connected to the first air engaging flexible and aerodynamic surface and the second air engaging flexible and aerodynamic surface; and
wherein the linear bearings permit the first air engaging flexible and aerodynamic surface and the second air engaging flexible and aerodynamic surface to move in a concurrent lateral and leeward direction, independent from the inner hub, rim and the attachment assembly configured to couple the rim to the inner hub.

17. The wheel of claim 14,
wherein the internal sliding mechanism comprises a free-floating cylinder that encircles the inner hub;
wherein the first air engaging flexible and aerodynamic surface and the second air engaging flexible and aerodynamic surface are each coupled to axially opposed circular faces of said free-floating cylinder; and
wherein the free-floating cylinder permits the first air engaging flexible and aerodynamic surface and the second air engaging flexible and aerodynamic surface to move in a concurrent lateral and leeward direction, independent from the inner hub, rim and the attachment assembly configured to couple the rim to the inner hub.

18. The wheel of claim 1, wherein the wheel has a stall angle of 15 to 25 degrees of yaw.

19. The wheel of claim 14, wherein the wheel has a stall angle of 15 to 25 degrees of yaw.

* * * * *